United States Patent [19]

Barstow et al.

[11] Patent Number: 5,189,630
[45] Date of Patent: Feb. 23, 1993

[54] METHOD FOR ENCODING AND BROADCASTING INFORMATION ABOUT LIVE EVENTS USING COMPUTER PATTERN MATCHING TECHNIQUES

[76] Inventors: David R. Barstow, 107 Laura La., Austin, Tex. 78746; Daniel W. Barstow, 98 Hillcrest Ave., New Britain, Conn. 06053

[21] Appl. No.: 641,716
[22] Filed: Jan. 15, 1991
[51] Int. Cl.⁵ .......................... H04H 1/00; H04N 7/00
[52] U.S. Cl. ........................................ 364/514; 358/335
[58] Field of Search ............... 364/514, 900, 578; 360/13, 14.1, 14.2, 14.3; 358/903, 335

[56] References Cited

U.S. PATENT DOCUMENTS

| | | | |
|---|---|---|---|
| Re. 33,559 | 3/1991 | Fallacaro et al. | 358/335 |
| 3,779,552 | 12/1973 | Buck | 273/88 |
| 4,342,454 | 8/1982 | Baer et al. | 273/856 |
| 4,425,586 | 1/1984 | Miller | 358/903 |
| 4,520,404 | 5/1985 | Von Kohorn | 358/335 |
| 4,550,407 | 10/1985 | Couason et al. | 371/15.1 |
| 4,641,203 | 2/1987 | Miller | 358/335 |
| 4,843,483 | 6/1989 | Bogner | 358/335 |
| 4,943,866 | 7/1990 | Barker | 358/335 |
| 4,949,187 | 8/1990 | Cohen | 358/903 |
| 4,994,922 | 2/1991 | Goddard | 358/310 |
| 5,038,211 | 8/1991 | Hallenbeck | 358/903 |

FOREIGN PATENT DOCUMENTS 183540 11/1985 European Pat. Off. .
355697 8/1989 European Pat. Off. .

OTHER PUBLICATIONS

WO, A1, 89/11199 (Vogel, Peter, Samuel) 16 Nov. 1989, see FIGS. 1-3; claims 1-7.
Patent Abstracts of Japan, vol. 11, No. 148, E506, Abstract of JP 61-285881, pub. 1986-12-16.

*Primary Examiner*—Parshotam S. Lall
*Assistant Examiner*—Michael Zanelli
*Attorney, Agent, or Firm*—Kenyon & Kenyon

[57] ABSTRACT

A live event may be broadcast with a combination signal that includes a computer coded description of subevents that constitute the event and an audio or visual signal. The viewer's computer then provides an indication to the viewer of the occurrence of subevents of interest and allows the viewer of the event to search for such subevents in a recording of the event.

19 Claims, 34 Drawing Sheets

OBSERVER WITH COMPUTER — ENCODED DESCRIPTION — DATABASE COMPUTER — TRANSMISSION — VIEWER WITH COMPUTER

EVENT_IDENTIFIER IN_PROGRESS NUMBER_OF_SUBEVENTS
{
 SUBEVENT_NUMBER START_TIME END_TIME
 [ START_TIME STOP_TIME ACTION_TYPE PARAMETER_VALUE PARAMETER_VALUE . . . ]
 [ START_TIME STOP_TIME ACTION_TYPE PARAMETER_VALUE PARAMETER_VALUE . . . ]
 . . .
}
. . .

FIG. 2

EVENT_IDENTIFIER START START_TIME

FIG. 4(a) MESSAGE AT START OF EVENT

EVENT_IDENTIFIER END END_TIME

FIG. 4(b) MESSAGE AT END OF EVENT

EVENT_IDENTIFIER { SUBEVENT_NUMBER . . . }

FIG. 4(c) MESSAGE FOR SUBEVENT

CRACK!
GASP!

IT'S A LONG FLY BALL ...

FIG.18
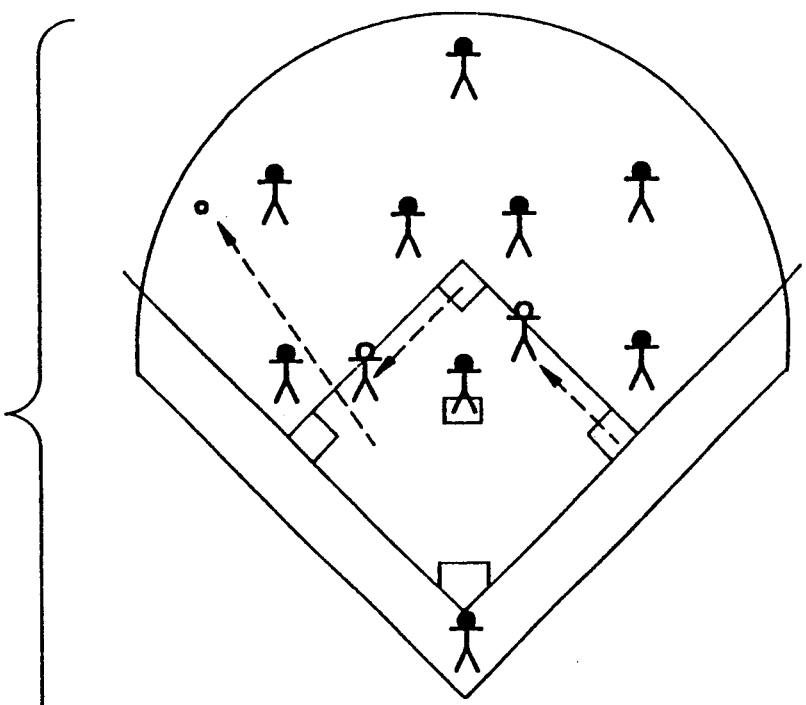
... DEEP TO LEFT ...
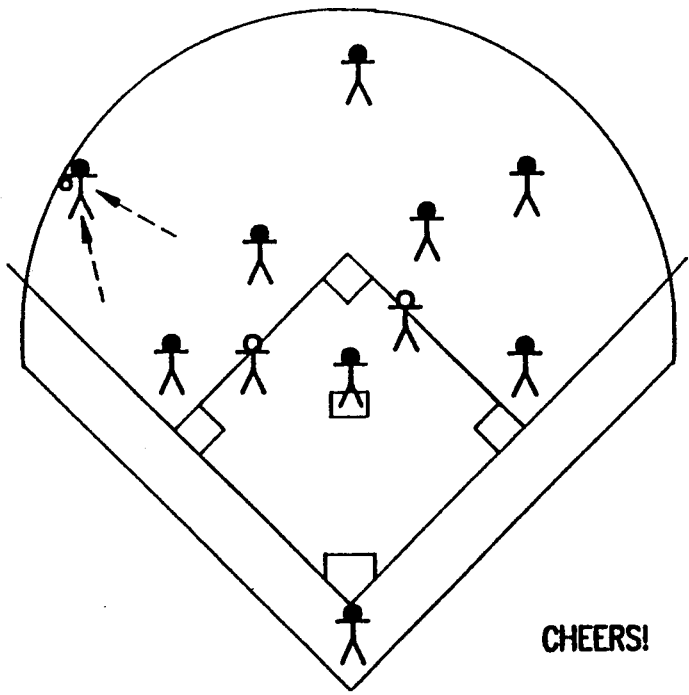
FIG.19
CHEERS!
CAUGHT BY THE LEFT FIELDER!

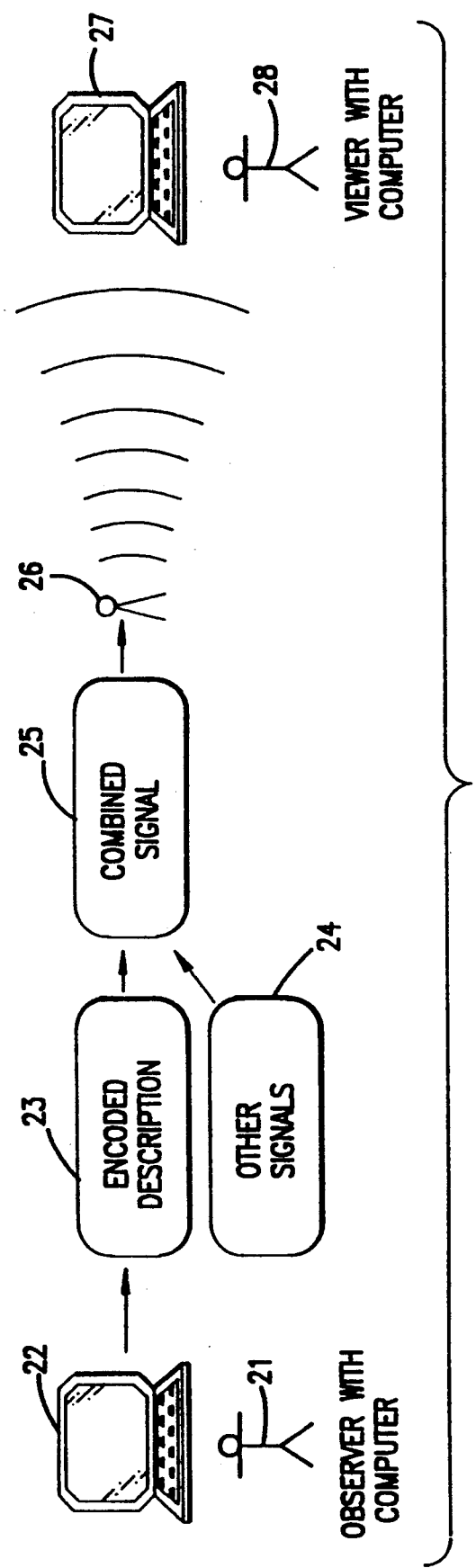

{ 4  1:45:30  1:46:45
    < (HOMESCORE 0)  (AWAYSCORE 0)  (INNING 1)  (OUTS 0)
        (TEAMATBAT AWAY)  (PLAYERATBAT AL_PEDRIQUE)
        (ONFIRST 0)  (ONSECOND 0)  (ONTHIRD GEORGE_FOSTER) >
  [ 1:45:30  1:46:45  TRIPLE RIGHTFIELD]
}

FIG.22A

{ 5  1:47:30  1:48:15
    < (HOMESCORE 0)  (AWAYSCORE 1)  (INNING 1)  (OUTS 1)
        (TEAMATBAT AWAY)  (PLAYERATBAT WADE_BOGGS)
        (ONFIRST 0)  (ONSECOND 0)  (ONTHIRD 0) >
  [ 1:47:30  1:48:15  SACRIFICEBUNT RIGHTINFIELD ]
  [ 1:47:30  1:47:55  ADVANCE THIRDBASE HOMEBASE ]
}

FIG.22B

{ 6  1:49:30  1:50:45
    < (HOMESCORE 0)  (AWAYSCORE 1)  (INNING 1)  (OUTS 2)
        (TEAMATBAT AWAY)  (PLAYERATBAT BO_JACKSON)
        (ONFIRST 0)  (ONSECOND 0)  (ONTHIRD 0) >
  [ 1:49:30  1:50:45  STRIKEOUT ]
}

FIG.22C

{ 7  1:51:30  1:52:00
    < (HOMESCORE 0)  (AWAYSCORE 2)  (INNING 1)  (OUTS 1)
        (TEAMATBAT AWAY)  (PLAYERATBAT JOSE_CANSECO)
        (ONFIRST 0)  (ONSECOND 0)  (ONTHIRD 0) >
  [ 1:49:30  1:50:45  HOMERUN RIGHTFIELD ]
}

FIG.22D

FIG.28A
1. ( ACTION ACTION_TYPE
      PARAMETER_VALUE_DESCRIPTION PARAMETER_VALUE_DESCRIPTION . . . )
2. { BEFORE STATUS_VARIABLE STATUS_VALUE_DESCRIPTION }
3. { AFTER STATUS_VARIABLE STATUS_VALUE_DESCRIPTION }
4. ( CHANGE STATUS_VARIABLE )

FIG.28B
1. {{ NOT PATTERN }}
2. {{ AND PATTERN PATTERN . . . }}
3. {{ OR PATTERN PATTERN . . . }}

FIG.29
1. (OR (CHANGE HomeScore) (CHANGE AwayScore) )
2. (ACTION HomeRun AnyField)
3. (AND (BEFORE PlayerAtBat AL_Pedrique)
        (OR (BEFORE OnSecond AnyPlayer) (BEFORE OnThird AnyPlayer) ) )

SUBEVENT 4, PATTERN 1

MATCH
   P: (OR (CHANGE HOMESCORE) (CHANGE AWAYSCORE))
   S1: < (HOMESCORE 0) (AWAYSCORE 0) (INNING 1) (OUTS 0)
        (TEAMATBAT AWAY) (PLAYERATBAT GEORGE_FOSTER)
        (ONFIRST 0) (ONSECOND 0) (ONTHIRD 0) >
(1)  S2: < (HOMESCORE 0) (AWAYSCORE 0) (INNING 1) (OUTS 0)
        (TEAMATBAT AWAY) (PLAYERATBAT AL_PEDRIQUE)
        (ONFIRST 0) (ONSECOND 0) (ONTHIRD GEORGE_FOSTER)
   AL: [ TRIPLE RIGHTFIELD ]
RECURSIVE CALL
   P: (CHANGE HOMESCORE)
RESULT: FALSE
RECURSIVE CALL
   P: (CHANGE AWAYSCORE)
RESULT: FALSE
RESULT: FALSE

SUBEVENT 4, PATTERN 2

MATCH
   P: (ACTION HOMERUN ANYFIELD)
   S1: < (HOMESCORE 0) (AWAYSCORE 0) (INNING 1) (OUTS 0)
        (TEAMATBAT AWAY) (PLAYERATBAT GEORGE_FOSTER)
        (ONFIRST 0) (ONSECOND )) (ONTHIRD 0) >
(2)  S2: < (HOMESCORE 0) (AWAYSCORE 0) (INNING 1) (OUTS 0)
        (TEAMATBAT AWAY) (PLAYERATBAT AL_PEDRIQUE)
        (ONFIRST 0) (ONSECOND 0) (ONTHIRD GEORGE_FOSTER)
   AL: [ TRIPLE RIGHTFIELD ]
RESULT: FALSE

SUBEVENT 4, PATTERN 3

MATCH
   P: (AND (BEFORE PLAYERATBAT AL_PEDRIQUE)
        (OR (BEFORE ONSECOND ANYPLAYER) (BEFORE ONTHIRD ANY PLAYER)))
   S1: < (HOMESCORE 0) (AWAYSCORE 0) (INNING 1) (OUTS 0)
        (TEAMATBAT AWAY) (PLAYERATBAT GEORGE_FOSTER)
        (ONFIRST 0) (ONSECOND 0) (ONTHIRD 0) >
(3)  S2: < (HOMESCORE 0) (AWAYSCORE 0) (INNING 1) (OUTS 0)
        (TEAMATBAT AWAY) (PLAYERATBAT AL-PEDRIQUE)
        (ONFIRST 0) (ONSECOND 0) (ONTHIRD GEORGE_FOSTER) >
   AL: [ TRIPLE RIGHTFIELD ]
RECURSIVE CALL
   P: (BEFORE PLAYERATBAT AL_PEDRIQUE)
RESULT: FALSE
RESULT: FALSE

FIG.32A

SUBEVENT 5, PATTERN 1

MATCH
    P:   (OR (CHANGE HOMESCORE) (CHANGE AWAYSCORE))
    S1:  < (HOMESCORE 0) (AWAYSCORE 0) (INNING 1) (OUTS 0)
          (TEAMATBAT AWAY) (PLAYERATBAT AL_PEDRIQUE)
          (ONFIRST 0) (ONSECOND 0) (ONTHIRD GEORGE_FOSTER) >
    S2:  < (HOMESCORE 0) (AWAYSCORE 1) (INNING 1) (OUTS 1)

(1)
          (TEAMATBAT AWAY) (PLAYERATBAT WADE_BOGGS)
          (ONFIRST 0) (ONSECOND 0) (ONTHIRD 0) >
    AL:  [ SACRIFICEBUNT RIGHTINFIELD ]
          [ ADVANCE THIRDBASE HOMEBASE ]
RECURSIVE CALL
    P:   (CHANGE HOMESCORE)
RESULT: FALSE
RECURSIVE CALL
    P:   (CHANGE AWAYSCORE)
RESULT: TRUE
RESULT: TRUE

SUBEVENT 5, PATTERN 2

MATCH
    P:   (ACTION HOMERUN ANYFIELD)
    S1:  < (HOMESCORE 0) (AWAYSCORE 0) (INNING 1) (OUTS 0)
          (TEAMATBAT AWAY) (PLAYERATBAT AL_PEDRIQUE)

(2)
          (ONFIRST 0) (ONSECOND 0) (ONTHIRD GEORGE_FOSTER) >
    S2:  < (HOMESCORE 0) (AWAYSCORE 1) (INNING 1) (OUTS 1)
          (TEAMATBAT AWAY) (PLAYERATBAT WADE_BOGGS)
    AL:  [ SACRIFICEBUNT RIGHTINFIELD ]
          [ ADVANCE THIRDBASE HOMEBASE ]
RESULT: FALSE

FIG.32B(i)

SUBEVENT 5, PATTERN 3

MATCH
   P:   (AND (BEFORE PLAYERATBAT AL_PEDRIQUE)
           (OR (BEFORE ONSECOND ANYPLAYER) (BEFORE ONTHIRD ANYPLAYER)))
   S1:  < (HOMESCORE 0) (AWAYSCORE 0) (INNING 1) (OUTS 0)
        (TEAMATBAT AWAY) (PLAYERATBAT AL_PEDRIQUE)
        (ONFIRST 0) (ONSECOND 0) (ONTHIRD GEORGE_FOSTER) >
   S2:  < (HOMESCORE 0) (AWAYSCORE 1) (INNING 1) (OUTS 1)
        (TEAMATBAT AWAY) (PLAYERATBAT WADE_BOGGS)
        (ONFIRST 0) (ONSECOND 0) (ONTHIRD 0) >
(3)  AL: [ SACRIFICEBUNT RIGHTINFIELD ]
       [ ADVANCE THIRDBASE HOMEBASE ]
RECURSIVE CALL
   P:    (BEFORE PLAYERATBAT AL_PEDRIQUE)
RESULT: TRUE
RECURSIVE CALL
   P:   (OR BEFORE ONSECOND ANYPLAYER) (BEFORE ONTHIRD ANYPLAYER))
   RECURSIVE CALL
      P:  (BEFORE ONSECOND ANYPLAYER))
   RESULT: FALSE
   RECURSIVE CALL
      P:  (BEFORE ONTHIRD ANYPLAYER))
   RESULT: TRUE
RESULT: TRUE
RESULT: TRUE

FIG.32B(ii)

```
SUBEVENT 6, PATTERN 1

MATCH
      P:   (OR (CHANGE HOMESCORE) (CHANGE AWAYSCORE))
      S1:  < (HOMESCORE 0) (AWAYSCORE 1) (INNING 1) (OUTS 1)
             (TEAMATBAT AWAY) (PLAYERATBAT WADE_BOGGS)
             (ONFIRST 0) (ONSECOND 0) (ONTHIRD 0) >
      S2:  < (HOMESCORE 0) (AWAYSCORE 1) (INNING 1) (OUTS 2)
             (TEAMATBAT AWAY) (PLAYERATBAT BO_JACKSON)
             (ONFIRST 0) (ONSECOND 0) (ONTHIRD 0) >
(1)   AL:  [ STRIKEOUT ]
      RECURSIVE CALL
         P:   (CHANGE HOMESCORE)
         RESULT: FALSE
      RECURSIVE CALL
         P:   (CHANGE AWAYSCORE)
         RESULT: FALSE
   RESULT: FALSE

SUBEVENT 6, PATTERN 2

MATCH
      P:   (ACTION HOMERUN ANYFIELD)
      S1:  < (HOMESCORE 0) (AWAYSCORE 1) (INNING 1) (OUTS 2)
             (TEAMATBAT AWAY) (PLAYERATBAT BO_JACKSON)
             (ONFIRST 0) (ONSECOND 0) (ONTHIRD 0)
(2)   S2:  < (HOMESCORE 0) (AWAYSCORE 2) (INNING 1) (OUTS 2)
             (TEAMATBAT AWAY) (PLAYERATBAT JOSE_CANSECO)
             (ONFIRST 0) (ONSECOND 0) (ONTHIRD 0) >
      AL:  [ HOMERUN RIGHTFIELD ]
   RESULT: FALSE

SUBEVENT 6, PATTERN 3

MATCH
      P:   (AND (BEFORE PLAYERATBAT AL_PEDRIQUE)
               (OR (BEFORE ONSECOND ANYPLAYER) (BEFORE ONTHIRD ANYPLAYER)))
      S1:  < (HOMESCORE 0) (AWAYSCORE 1) (INNING 1) (OUTS 2)
             (TEAMATBAT AWAY) (PLAYERATBAT BO_JACKSON)
(3)          (ONFIRST 0) (ONSECOND 0) (ONTHIRD 0) >
      S2:  < (HOMESCORE 0) (AWAYSCORE 2) (INNING 1) (OUTS 2)
             (TEAMATBAT AWAY) (PLAYERATBAT JOSE_CANSECO)
             (ONFIRST 0) (ONSECOND 0) (ONTHIRD 0) >
      AL:  [ HOMERUN RIGHTFIELD ]
      RECURSIVE CALL
         P:   (BEFORE PLAYERATBAT AL_PEDRIQUE)
         RESULT: FALSE
   RESULT: FALSE
```

FIG.32C

```
SUBEVENT 7, PATTERN 1

MATCH
       P:   (OR (CHANGE HOMESCORE) (CHANGE AWAYSCORE))
       S1:  < (HOMESCORE 0) (AWAYSCORE 1) (INNING 1) (OUTS 2)
              (TEAMATBAT AWAY) (PLAYERATBAT BO_JACKSON)
              (ONFIRST 0) (ONSECOND 0) (ONTHIRD 0) >
       S2:  < (HOMESCORE 0) (AWAYSCORE 0) (INNING 1) (OUTS 2)
(1)           (TEAMATBAT AWAY) (PLAYERATBAT JOSE_CANSECO)
       AL:  [ HOMERUN RIGHTFIELD ]
   RECURSIVE CALL
       P:   (CHANGE HOMESCORE)
       RESULT: FALSE
   RECURSIVE CALL
       P:   (CHANGE AWAYSCORE)
       RESULT: TRUE
   RESULT: TRUE

SUBEVENT 7, PATTERN 2

MATCH
       P:   (ACTION HOMERUN ANYFIELD)
       S1:  < (HOMESCORE 0) (AWAYSCORE 1) (INNING 1) (OUTS 2)
              (TEAMATBAT AWAY) (PLAYERATBAT BO_JACKSON)
              (ONFIRST 0) (ONSECOND 0) (ONTHIRD 0) >
(2)    S2:  < (HOMESCORE 0) (AWAYSCORE 2) (INNING 1) (OUTS 2)
              (TEAMATBAT AWAY) (PLAYERATBAT JOSE_CANSECO)
              (ONFIRST 0) (ONSECOND 0) (ONTHIRD 0) >
       AL:  [ HOMERUN RIGHTFIELD ]
   RESULT: TRUE

SUBEVENT 7, PATTERN 3

MATCH
       P:   (AND (BEFORE PLAYERATBAT AL_PEDRIQUE)
                 (OR (BEFORE ONSECOND ANYPLAYER) (BEFORE ONTHIRD ANYPLAYER)))
       S1:  < (HOMESCORE 0) (AWAYSCORE 1) (INNING 1) (OUTS 2)
              (TEAMATBAT AWAY) (PLAYERATBAT BO_JACKSON)
              (ONFIRST 0) (ONSECOND 0) (ONTHIRD 0) >
(3)    S2:  < (HOMESCORE 0) (AWAYSCORE 2) (INNING 1) (OUTS 2)
              (TEAMATBAT AWAY) (PLAYERATBAT JOSE_CANSECO)
              (ONFIRST 0) (ONSECOND 0) (ONTHIRD 0) >
       AL:  [ HOMERUN RIGHTFIELD ]
   RECURSIVE CALL
       P:   (BEFORE PLAYERATBAT AL_PEDRIQUE)
       RESULT: FALSE
   RESULT: FALSE
```

FIG.32D

|  | PATTERN 1 | PATTERN 2 | PATTERN 3 |
|---|---|---|---|
| SUBEVENT 4 | FALSE | FALSE | FALSE |
| SUBEVENT 5 | TRUE | FALSE | TRUE |
| SUBEVENT 6 | FALSE | FALSE | FALSE |
| SUBEVENT 7 | TRUE | TRUE | FALSE |

FIG.33

METHOD FOR ENCODING AND BROADCASTING INFORMATION ABOUT LIVE EVENTS USING COMPUTER PATTERN MATCHING TECHNIQUES

BACKGROUND OF THE INVENTION

1. Field of the Invention

The present invention relates to a method for broadcasting information about live events. In particular, the present invention utilizes computer encoded techniques to represent the actions of a live event with code symbols and broadcasts those encoded representations to viewers who desire such information along with additional information about the event. The encoded information is used to provide additional services.

2. Related Art

The broadcasting of live events is well-known. Most commonly live events are broadcast as audio information or a combination of video and audio information utilizing either radio transmission techniques or television transmission techniques, respectively. There are limitations to both of these broadcasting techniques. Radio broadcasting provides no visual representation of the action being described. Video information of a television transmission is restricted by the angle of the television camera selected for transmission of a particular action within the event. In addition, unless the observer video tapes a television transmission or audio tapes a radio transmission, there is no possibility for replaying actions that occur within the event and there is no capability for the viewer to view or listen to only selected portions of the event, to review selected portions of the event, or to view the event at the viewer's leisure.

Furthermore, the known broadcast techniques do not provide the viewer with the capability of quickly identifying and viewing subevents of interest or of being notified when a subevent of interest occurs.

It is also well known to utilize computers to simulate activities. In particular, computer simulation techniques to represent the testing of the operation of devices are well known. Thus, computer programmers familiar with simulation techniques are familiar with programs required for simulating activities on a computer. However, such simulation techniques have not been utilized in conjunction with the broadcast of live events, which can be represented as a sequence of well-defined actions.

SUMMARY OF THE INVENTION

The present invention is directed to a method for broadcasting live events which overcomes the shortfalls of radio and television broadcasting. In particular, the present invention utilizes computer simulation techniques to characterize the actions of a live event, providing symbolic representations for the actions of the event rather than direct audio or visual signals. According to the method there is a broadcast of those characterizations. The live event can then be simulated at a remote location utilizing the characterizations or symbolic representations. Furthermore, the symbolic representations may be combined with other information about the event, such as audio or visual signals. The method makes it possible to use computer pattern-matching techniques to provide additional services to the viewer.

This broadcasting method has a number advantages over other live broadcast techniques. First, the viewer may view the event at any time and may repeatedly view parts of the event. Secondly, the viewer can select a visual perspective for a given action within the event and can also choose to have information about the event displayed in graph or chart form rather than as visual images. Third, the user of the system is capable of monitoring a plurality of events simultaneously. Fourth, the method of the present invention results in using less bandwidth to broadcast a live event than is typically utilized for either radio or television broadcasts of such an event. Additionally, the viewer need not view the entire event in order to view subevents of interest. Instead, he may characterize subevents of particular interest and be notified when such subevents occur. Also, the viewer may record an entire event and then search it quickly for subevents of particular interest.

In a method according to the present invention, an event, in which a discrete number of actions, from a finite set of action types which define the nature of the event, occur, is characterized as a sequence of subevents constituted by such actions. Each action is definable by its action type and zero or possibly several parameters associated with that action type. Additionally, the status of each event may be described by a set of status variables and values. The event may be observed by an observer who attends or watches the event and monitors each of the actions which occurs in the course of the event. The observer enters associated parameters for each action which takes place during the event. The event is thus represented by a sequence of subevents each described by a sequence of characterizations of a plurality of actions in terms of parameters which are entered into an event file of a centralized data base computer which is accessible by the observer. The centralized data base computer may either be located at the site of the event or at a remote location and the information can be transmitted by the observer to the centralized data base computer. In either alternative, the observer, having access to a computer, encodes the event as a series of actions having associated therewith various parameters which define the actions that have taken place. The encoded description may be combined with other signals providing information about the event such as audio or video signals. The combined signal is transmitted to a viewer. The viewer receives encoded descriptions of the actions of the event at a viewer's computer and can reconstruct the actions of each subevent of the selected event by using the parameter information associated with each action and can identify subevents of particular interest. The actions can be represented to the viewer either with visual images, audio images, or text, or some combination thereof.

The viewer will be able to select a perspective view for a visual image that is displayed on the display device associated with the viewer's computer. In addition, the viewer will be able to replay any portion of the event as already stored in an event file of a viewer data base at the viewer's computer. In connection with this replay capability, the viewer may record the entire transmission and then search only for the occurrence of subevents of interest based on the encoded description information and then replay only those subevents.

Furthermore, the viewer will be able to update the viewer computer data base with event information from the centralized data base computer at any time. In addition, the viewer's computer will be able to access the action information of a plurality of events from the centralized data base computer and store such information in a viewer file, permitting the viewer to select from any one of the plurality of events for view. In addition, the viewer will be able to interrupt the display of the event on the viewer's computer at any time and return to any action within the event once it is stored in the viewer's computer data base.

One such typical event would be a sporting event such as a baseball game. It is also possible to utilize this system with such events as the activities involving a stock market, an election, an auction and any other event where a finite set of possible action types can be defined prior to the beginning of the event.

BRIEF DESCRIPTION OF THE DRAWINGS

FIG. 2 is an example of a textual representation of an event in accordance with the first embodiment of the present invention.

FIGS. 4(a) to 4(c) are illustrations of textual formats of messages sent by the observer's computer implementing the first embodiment of the present invention.

FIGS. 14 to 19 illustrate graphic representations corresponding to an example of the use of the first embodiment of the present invention.

FIG. 20 illustrates a pictorial representation of a transmission system utilizing a second embodiment of the broadcast method of the present invention.

FIG. 21 is an example of a textual representation of a subevent in accordance with the second embodiment of the present invention.

FIGS. 22A, 22B, 22C and 22D are textual representations of example subevents for use in the second embodiment of the present invention.

FIGS. 28A and 28B illustrate textual representations of subevent patterns in accordance with the second embodiment of the present invention.

FIG. 29 illustrates a textual representation of example subevent patterns in accordance with the second embodiment of the present invention.

FIGS. 32A to 32D illustrate the operation of the algorithm of FIG. 31 in connection with the subevents of FIG. 22 applied to the patterns of FIG. 29.

FIG. 33 illustrates, in tabular form, the results of a matching operation using the example subevents of FIG. 32, the patterns of FIG. 29 and the algorithm of FIG. 31.

DETAILED DESCRIPTION OF THE PRESENT INVENTION

First Embodiment

Figure 1:
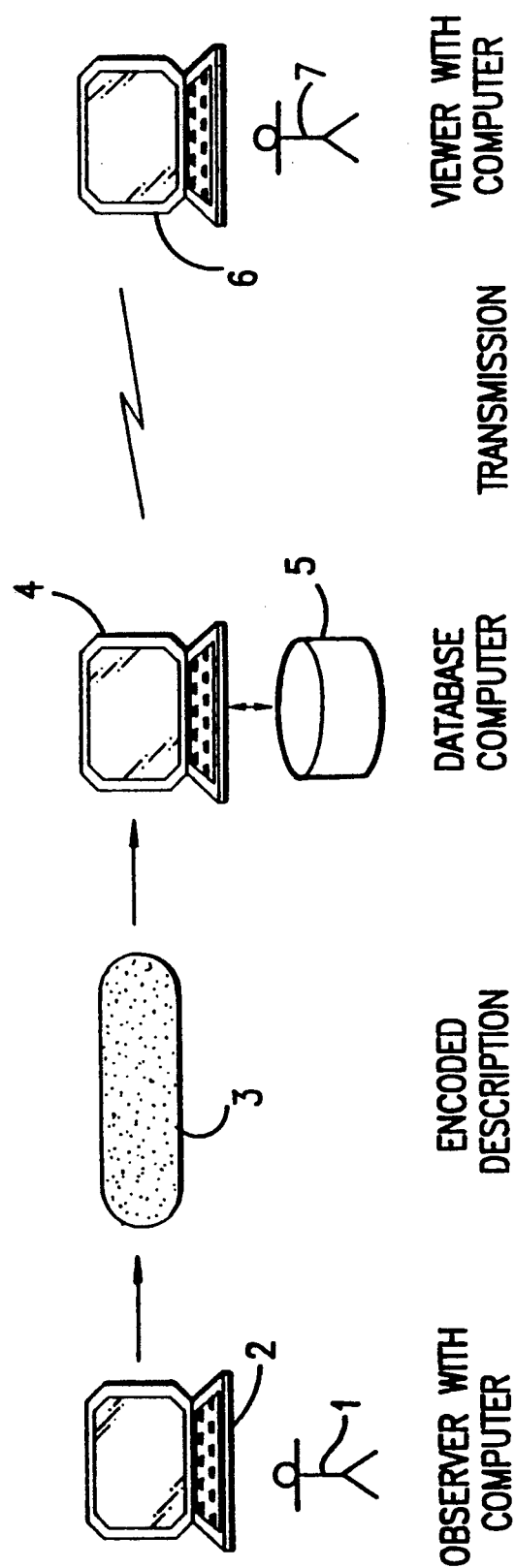
FIG. 1 is a pictorial representation of a v transmission system utilizing a first embodiment of the broadcast method of the present invention.

FIG. 1 illustrates the elements for use in a system for carrying out the broadcast method of the present invention. In FIG. 1 an observer 1 with a computer 2 observes a live event (not shown) which can be described as an ordered sequence of discrete subevents, with each subevent consisting of a set of actions. Each action is a parameterized instance of one of a finite set of action types. The observer enters the actions into the observer computer 2 resulting in an encoded description 3 of the event as a series of subevents, each subevent consisting of parameterized actions. The encoded description will be transmitted to a centralized data base computer 4. The data base computer has a data base file 5 associated with a given event and stores the sequence of subevents as received from the observer computer. A viewer 7 with a computer 6 will be able to access the data base file 5 associated with a particular event from the centralized data base computer 4. The viewer 7 with a computer 6 receives a transmission of the sequence of subevents stored in an event file of the data base file 5 corresponding to the desired event. The viewer 7 then selects the type of display warranted for the event in question, either a textual display, or a visual display, or visual-audio display. The viewer's computer 6 then operates on the encoded description transmitted by the centralized data base computer 4 so as to produce the desired report of the event.

It is possible to have a plurality of observers 1 with computers 2 at a plurality of events where the encoded description of each event is transmitted by the associated observer and the observer's computer to the centralized data base computer 4. The viewer 7 may then select from the data base computer that event which is of interest to the viewer 7, or can access all of the information with respect to all of the events and continue to update all events in the viewer's computer 6 while viewing only one event at a given time.

The encoded description of the event includes an ordered sequence of subevents. As constructed, each subevent is identified by a number and the subevent descriptor includes the number of that particular subevent. In addition the subevent descriptor identifies the start time of the subevent and the end time in connection with the live event. Each subevent descriptor also includes a set of one or more actions. Each action has associated therewith a tag indicating the begin and end times of the action, the type of action taking place, as well as values for parameters associated with the designated type of action. The types of actions and the parameters depend upon the nature of the real event. It will of course be possible to use the encoded description either to describe an entire sequence of subevents of an entire event after it has ended or to describe an initial subsequence of subevents prior to the completion of the event. It will be possible with this encoding scheme to continuously update the data base file of the centralized data base computer with encoded descriptions of the event as it transpires, rather than waiting until the completion of the event.

FIG. 2 illustrates one possible textual representation of an event as it could be entered into the observer's computer to create information regarding the event. First, there is associated with a given event, an event identifier, so that a viewer can later select from a plurality of events which are updated by the centralized data base computer. Whether or not the event is still in progress will also be noted. In addition, the textual representation provides an indication of the number of subevents which have occurred so far in the event. Each subevent is identified by a number and has a start time and an end time in relation to the event. Associated with each subevent are one or more actions where each action has associated therewith an identifier to identify the start and stop times of the actions in the subevent. Each action is of a particular action type and will be identified by an action type tag. Each action type may have associated therewith zero or more parameters. Therefore, the list of actions for a particular sub-event number is set forth as one or more actions where each action is described by its start and stop times, an action type descriptor and a value for the parameters which are associated with that action type, if any. This textual representation of an event could be constructed by an observer utilizing a computer while observing the action occurring during an event. This representation is then be used for internal processing purposes. The advantage of a textual representation such as this is that textual characters are a standard form of interchange between computers and hence standard communication mechanisms may be used to communicate between the observer's computer, the database computer and the viewer's computer.

Figure 3:
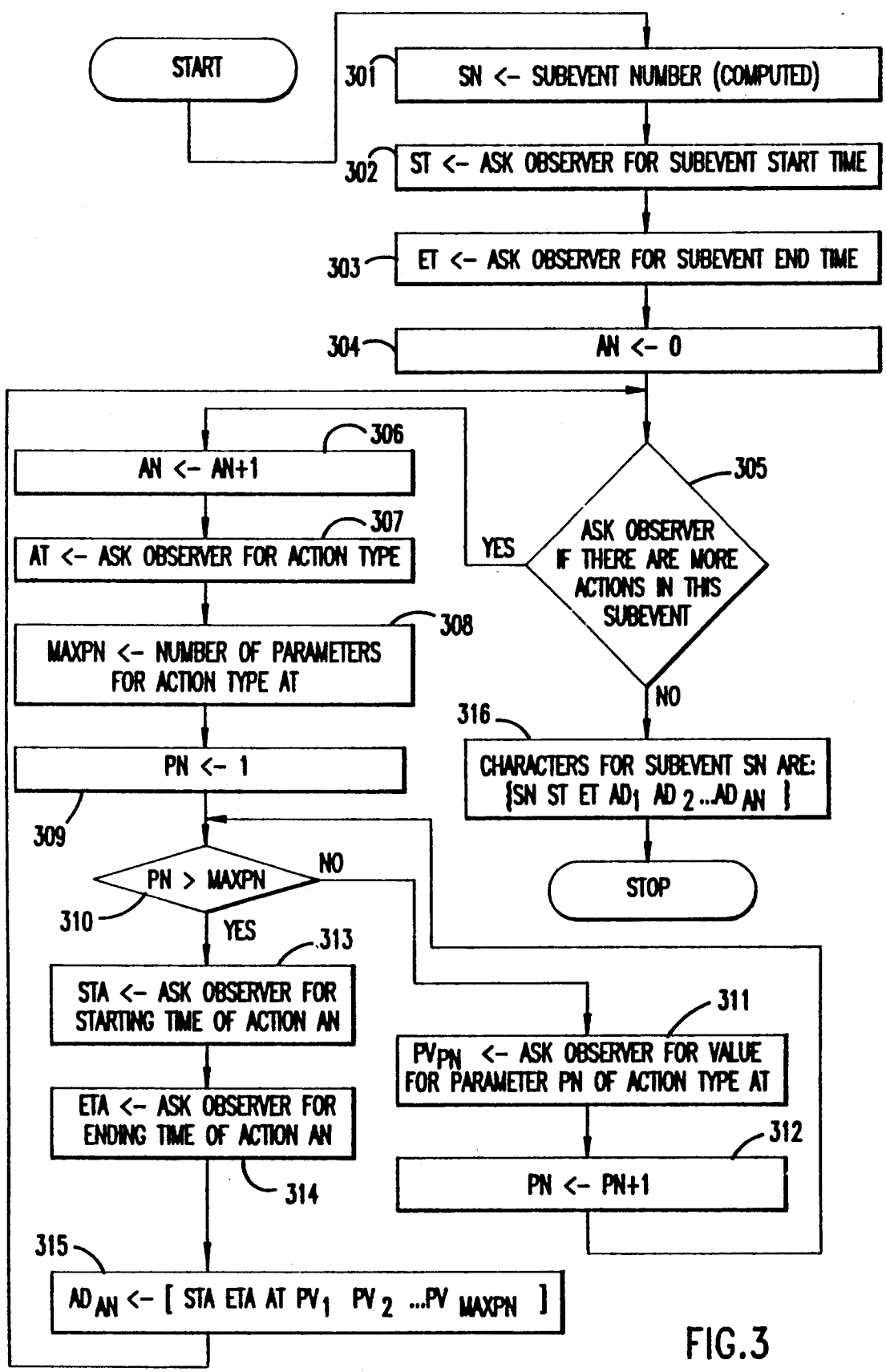
FIG. 3 is a flow chart of an algorithm usable by an observer in implementing the first embodiment of the present invention.

Entering this encoded description by typing could be cumbersome depending on the number of actions involved in a subevent and the speed of the event being observed. Another possible technique for recording the event would be to use prompts generated by a special purpose software developed to assist the observer. The software provides a menu of possible action types and prompts an observer for relevant information about start and stop times and parameters after an action type is selected. A flow chart illustrating an algorithm for the special purpose software is set forth in FIG. 3.

At step 301, the subevent number SN is provided by the observer's computer. At step 302, the computer asks the observer for a start time (ST) for the subevent identified as SN. At step 303, the computer asks the observer for an end time (ET) for the subevent. An action number AN initially is set to "0" at step 304. The computer then asks the observer if there are any more actions occurring in this subevent at decision step 305. If there are additional actions in this subevent, then the action number AN is incremented by 1 at step 306 and the computer asks the observer for the identification of the action type AT. Once the action type AT is selected, the observer's computer, in step 308, retrieves the maximum number of parameters for actions of the type identified in step 307. The maximum number of parameters is identified as MAXPN. The parameter number PN then is set to 1 in step 309. Decision step 310 compares the parameter number PN to the value of MAXPN, the number of parameters for the given action type. So long as the maximum number of parameters has not been exceeded, the observer asks for a parameter value associated with the parameter number PN of action AT. This is step 311. After the observer enters the parameter value $PV_{PN}$, the parameter number PN is incremented by 1 in step 312 and the comparison decision of step 310 is carried out again. This loop continues until PN exceeds the MAXPN, the maximum number of parameters for the action type defined. Then decision step 310 jumps to step 313 at which time the computer asks the observer for the start time of action AN. In step 314, the computer asks the observer for the stop time of action AN. Then at step 315 the computer defines a sequence of characters, $AD_{AN}$, as the sequence of characters representing the action, namely the start time, stop time, the action type and the parameter values associated with that action. The algorithm continues to step 305 in which a decision is made as to whether the observer has any additional actions to enter with regard to the subevent. The loop of steps 305 to 315 continues until the observer has no additional actions to enter with regard to the identified subevent. At this point, the characters for subevent SN are set as the subevent number, start and end times of the subevent and the sequence of action descriptors in step 316.

It is also possible that the special user software could employ graphically-oriented techniques to additionally support the observer. For example, if a required parameter is the name of a participant in the event, the software prompts the observer with a complete list of participants and asks the observer to select one participant from the list. Furthermore, if a location is a parameter associated with an action, then the observer's computer may present a diagram of the site, and permit the observer, by use of a pointing device, such as a mouse, to point to the relevant location on the diagram to correspond to the parameter. Such prompting and pointing techniques in software are well-known.

Once the observer has constructed the encoded description of the subevent, the description is sent to a centralized data base computer 4 as illustrated in FIG. 1. The data base computer receives this updated subevent information from the observer's computer and appends it to the sequence of subevents associated with the given event as stored in the centralized data base computer file 5. This updating is best accomplished by maintaining a permanent communications link between the observer's computer and the centralized data base computer. If a textual representation of the encoded subevent description is to be utilized, such as that illustrated in FIG. 2, then standard communications software is used to transmit the appropriate sequence of characters. Thus, the sequence of subevents stored in the data base computer file 5 will always be complete and accurate shortly after the actual subevent has occurred.

FIGS. 4(a) to 4(c) illustrate a textual format of messages from an observer's computer. FIG. 4(a) illustrates the format of a message to be sent at the beginning of an event. The message includes an event identifier and a start time for the event. FIG. 4(b) illustrates a message to be constructed by the observer at the end of the event, including the event identifier and the designation of an end time to the event. Furthermore, during the course of the event, the observer sends subevent messages illustrated in FIG. 4(c), including an event identifier, and then the subevent number and sequence of associated information as described with respect to FIG. 3 above.

Figure 5A:
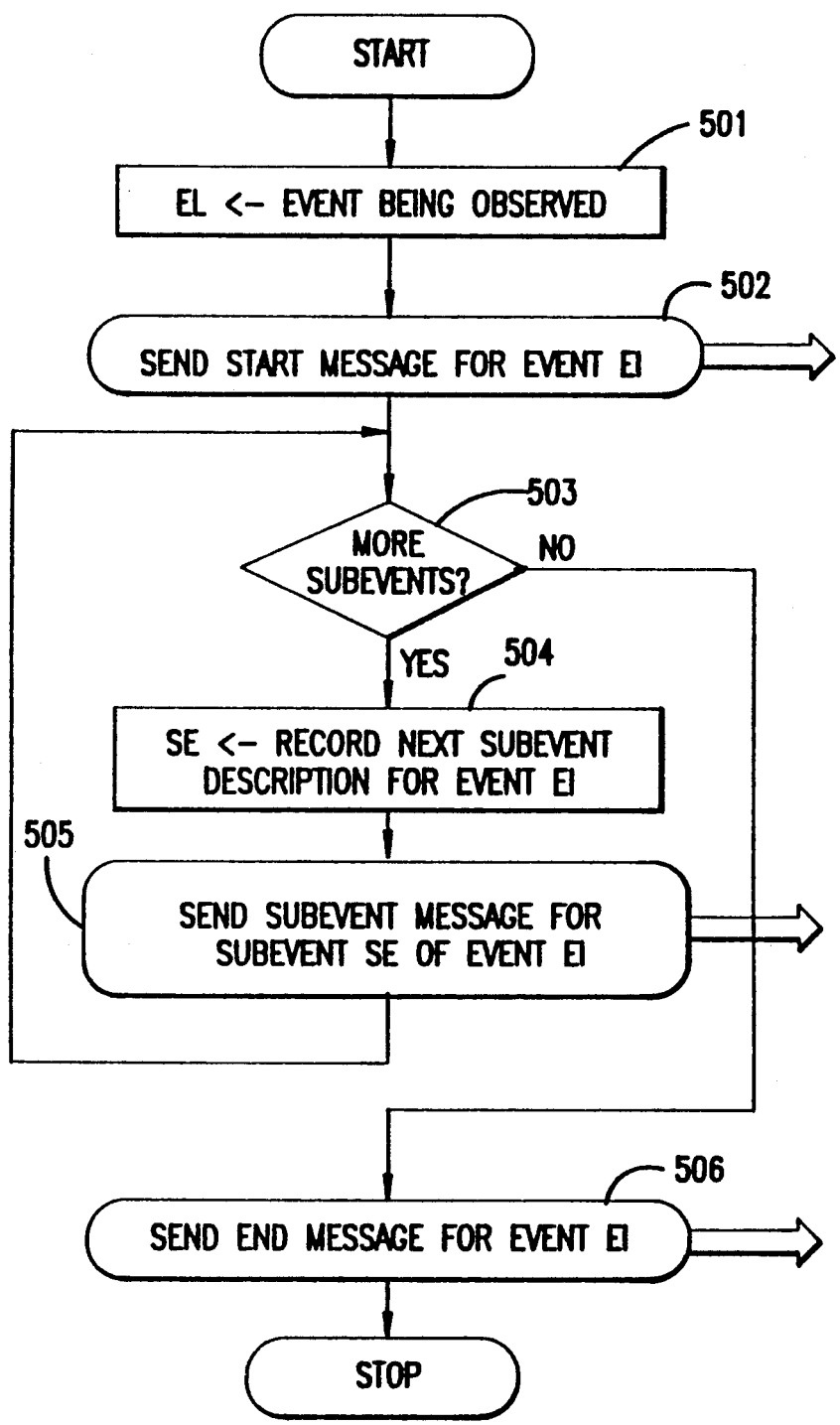
FIGS. 5(a) and 5(b) are flow charts for algorithms to run on an observer's computer and a centralized data base computer, respectively, in accordance with the first embodiment of the present invention.
Figure 5B:
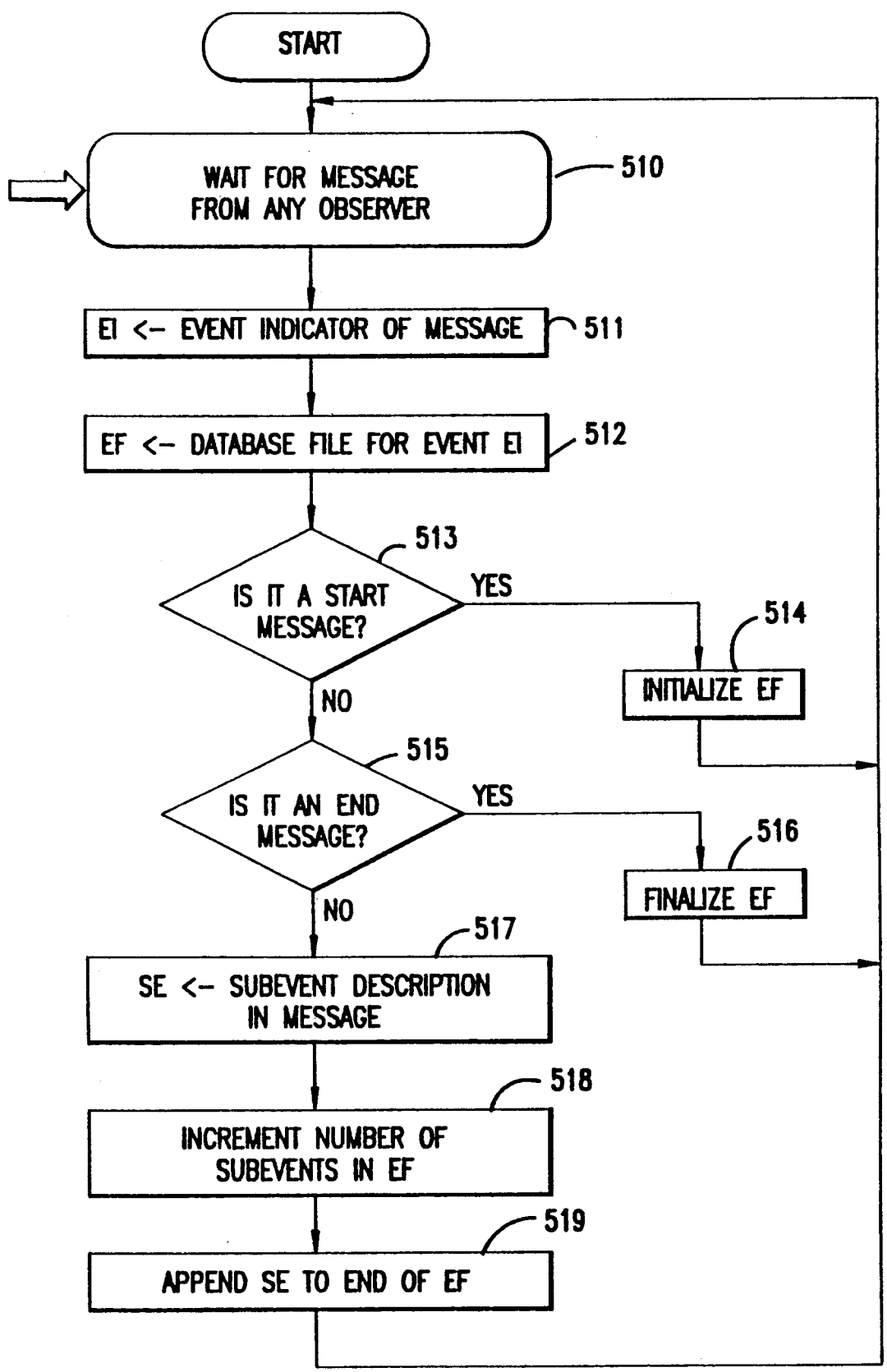

The centralized data base file 5 is able to store the sequences of subevents for a plurality of different events as they are happening, simultaneously, by storing the information in separate files. Whenever information with regard to a particular event is received at the centralized computer data base, the file corresponding to that event is updated with the new subevent information. FIGS. 5(a) and 5(b) illustrate the algorithms at the observer's computer 2 and the centralized data base computer 4 for updating a file of a given event as stored in the centralized data base computer file 5. FIG. 5(a) illustrates the flow chart of the algorithm to be utilized by the observer's computer, while FIG. 5(b) illustrates a flow chart of the algorithm utilized at the centralized data base computer 4. In FIG. 5(a) in step 501, the event being observed is identified with an event identifier EI. The identifier is then sent along with a START message by the observer in step 502 to the centralized data base computer which, in step 510, is waiting for messages from any observer computers. Once the observer sends a START message for an event, the decision step 503 determines if there are any more subevents. If so, the observer records the next subevent description SE in step 504, in accordance with the algorithm described in FIG. 3. In step 505, the subevent description of subevent SE is then sent as a message associated with event EI. If, in step 503, the observer's computer detects that there are no more subevents as indicated by the observer, then the observer's computer sends an END message for event EI as in step 506. Steps 502, 505 and 506 all send information to the centralized data base computer which, as stated above, waits for messages from any observer computer in step 510. The centralized data base computer then identifies the event indicator of the received message in step 511 and identifies, at step 512, the associated file EF on the data base computer that corresponds to EI. In step 513, the centralized data base computer determines whether the received message is a START message. If so, in step 514, the data base initializes file EF and then returns to the WAIT state, step 510, to await additional messages. If the message is not a START message, then the centralized data base computer decides whether the message received is an END message at step 515. If so, step 516 is executed by which the file EF is finalized. The data base computer then enters the WAIT state of step 510. If the message received is neither an END message, nor a START message, then step 517 identifies the subevent description SE received in the message from the observer computer. In step 518, the number of subevents in EF is incremented and the subevent description from the message SE is appended to the end of the file EF in step 519. The centralized data base computer then returns to the WAIT state of step 510.

Once the centralized data base file has been updated by the observer or observers at various events, the event data descriptive of the subevents constituting a particular event are maintained in the updated centralized data base file for access of a viewer or viewers.

Figure 6:
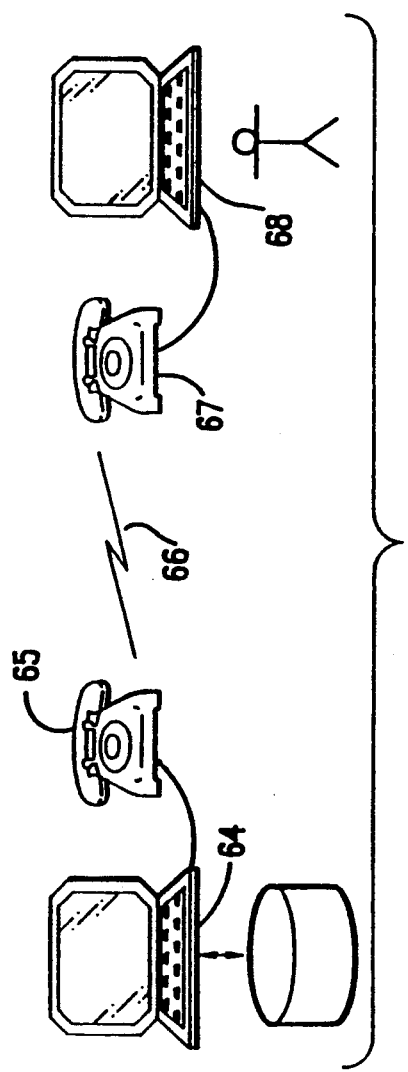
FIG. 6 illustrates a transmission technique for transmitting information between a centralized data base computer and a viewer's computer in accordance with the first embodiment of the present invention.

There are two basic techniques for transmitting encoded descriptions from the centralized data base computer to a viewer's computer. The first technique utilizes a two-way communication technology such as standard telephone connection technology utilizing modems attached to the viewer's computer and the centralized data base computer. This two-way communication scheme is illustrated in FIG. 6 of the application in which the data base computer 64 is connected by a telephone 65 through telephone line 66 to telephone 67, associated with the viewer's computer 68.

Figure 7B:
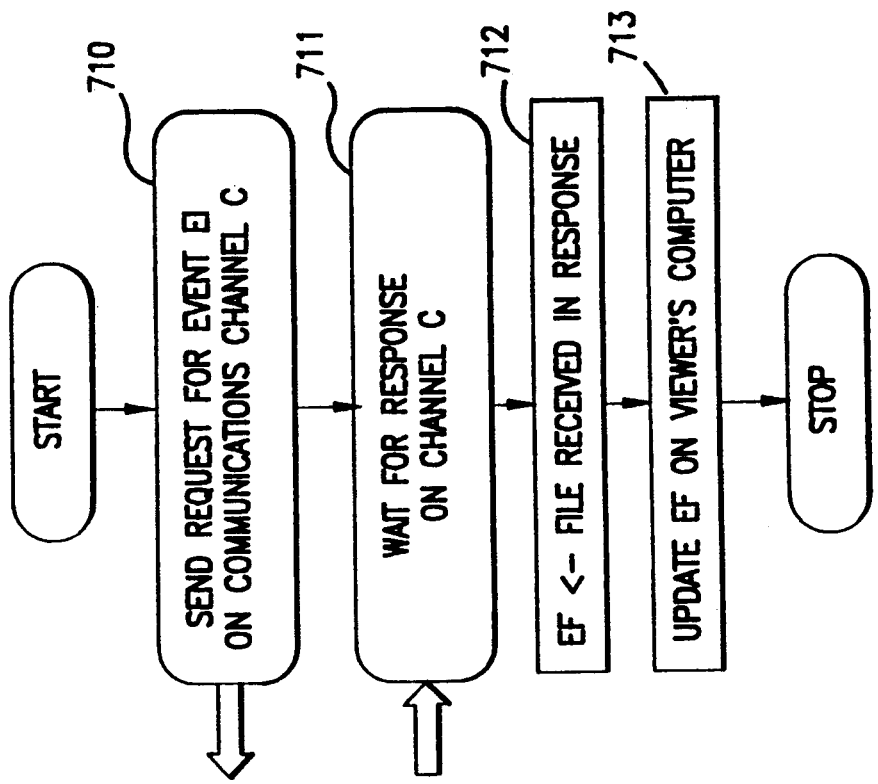
FIGS. 7(a) and (b) are flow charts for an algorithm for the two-way communication illustrated in FIG. 6.
Figure 7A:
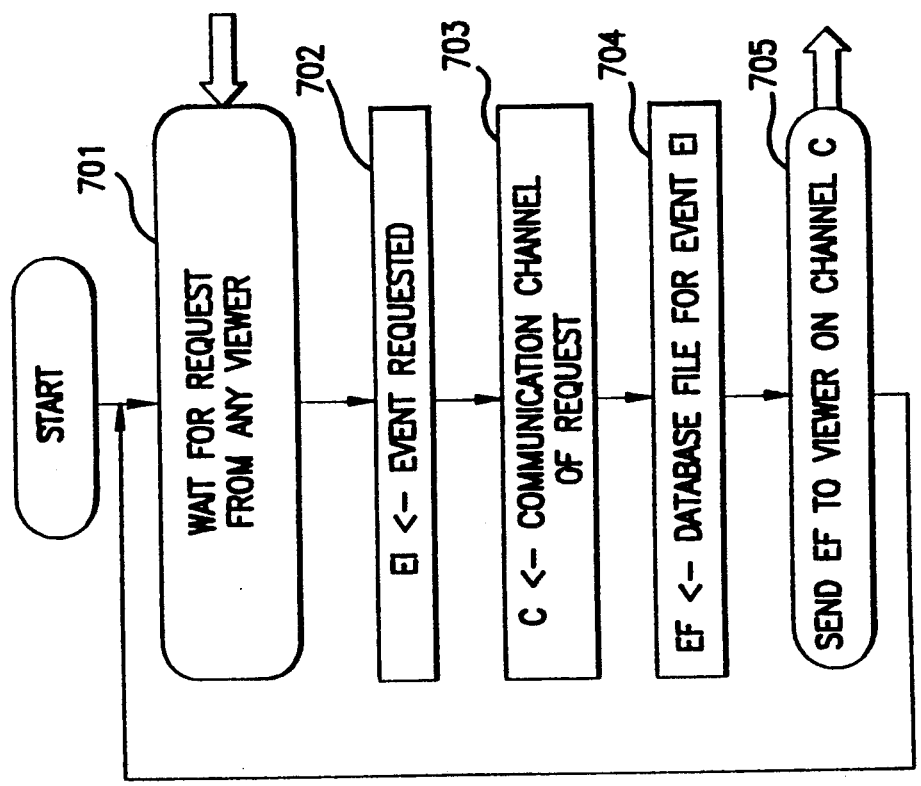

A flow chart illustrative of an algorithm for two-way communication is set forth in FIGS. 7(a) and 7(b) for the data base computer and the viewer's computer, respectively. The data base computer waits for a request from a viewer as shown at step 701. Once a request is received, the data base computer identifies the event identifier EI requested by the viewer in step 702. The centralized data base computer then identifies the communication channel of the request in step 703 and accesses the data base file corresponding to the event EI in step 704. In step 705, the data base computer sends data base file EF to the viewer on the selected channel C. In FIG. 7(b), the viewer's computer sends a request at step 710 asking for a particular file, identified as EI, via communications channel C. The viewer's computer then waits, in step 711, for a response on channel C as sent by step 705 of FIG. 7(a). The viewer then accesses the file received in the response EF in step 712 and in step 713 updates the corresponding file on the viewer's computer with the information transmitted to the viewer's computer in step 705 of FIG. 7(a).

The frequency of updates in the two-way communication scheme is controlled, not only in response to the updating by observers, but also by the frequency with which the viewer accesses the centralized data base computer. In the two-way communication scheme the viewer can request updates continually or at irregular intervals or even wait until the event was over and then access the information by requesting it from the centralized computer data base.

Figure 8:
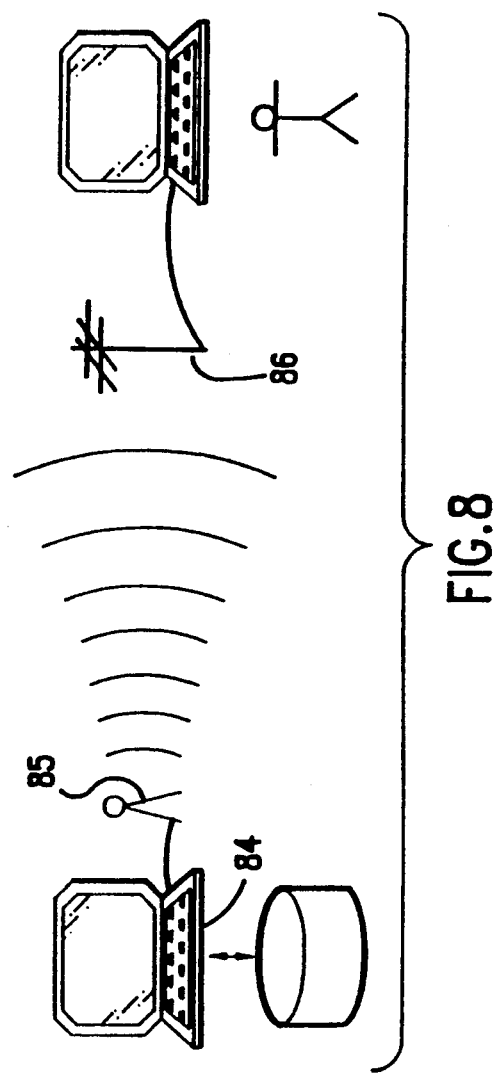
FIG. 8 illustrates a transmission technique for one-way communication between a centralized data base computer and a viewer's computer.

A second technique by which a viewer may access material regarding an event or have the viewer's computer data base updated utilizes a one-way broadcast technology such as radio, television or microwave, either through the air or through a cable. This technique is illustrated in FIG. 8 where the centralized data base computer 84 outputs updates of the event, based on updates received from the observer, through a transmitter, such as a broadcast transmitter 85, to be received at the viewer's computer location by antenna mechanism 86. The centralized data base computer thus uses a broadcasting device to repeatedly transmit the most recent version of the entire sequence of encoded subevents of an event. Whenever the data base is updated to include new subevents from the observer's computer, the data base begins broadcasting the entire sequence of the event, including the new subevents as an update for viewers. A special receiving device is attached to the viewer's computer and receives the broadcast transmission and stores the encoded sequence of new subevents on the viewer's computer.

The frequency of updating in the one-way communication scheme is determined by the frequency with which the centralized data base computer broadcasts encoded sequences. This frequency, in turn, depends upon the amount of information in the event descriptions and on the bandwidth of the broadcast technique. Even when the same broadcast channel is used for multiple simultaneous real events, the viewer's computer is typically updated within a few seconds of when the data base computer is updated by communication from the observer's computer.

Figure 9B:
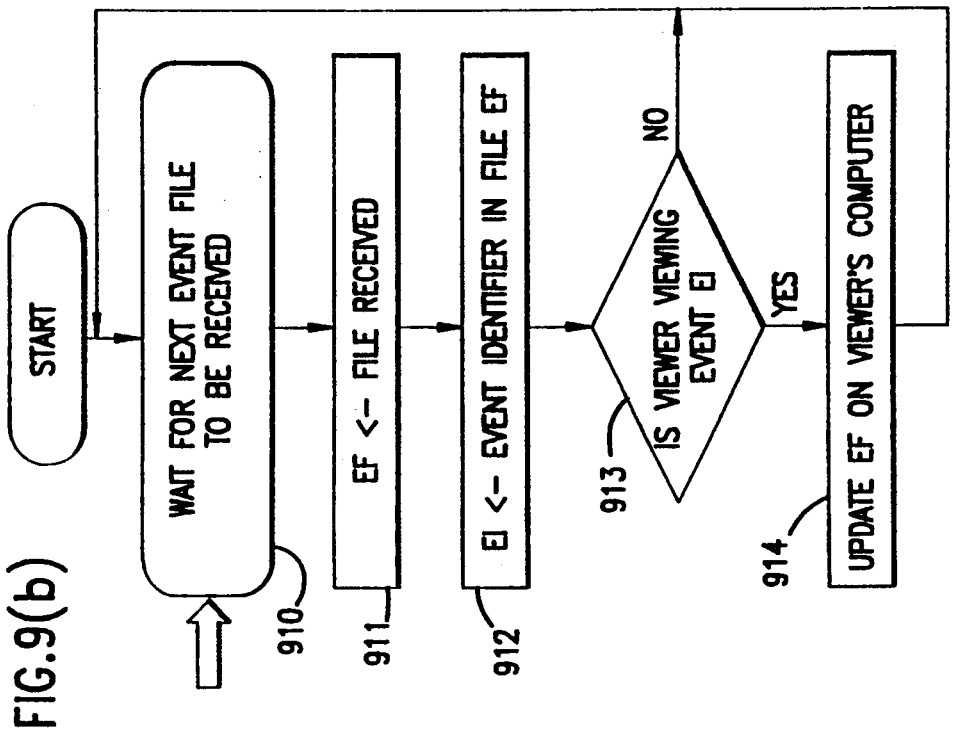
FIGS. 9(a) and 9(b) illustrate a flow chart of algorithms for the one-way communication illustrated in FIG. 8.
Figure 9A:
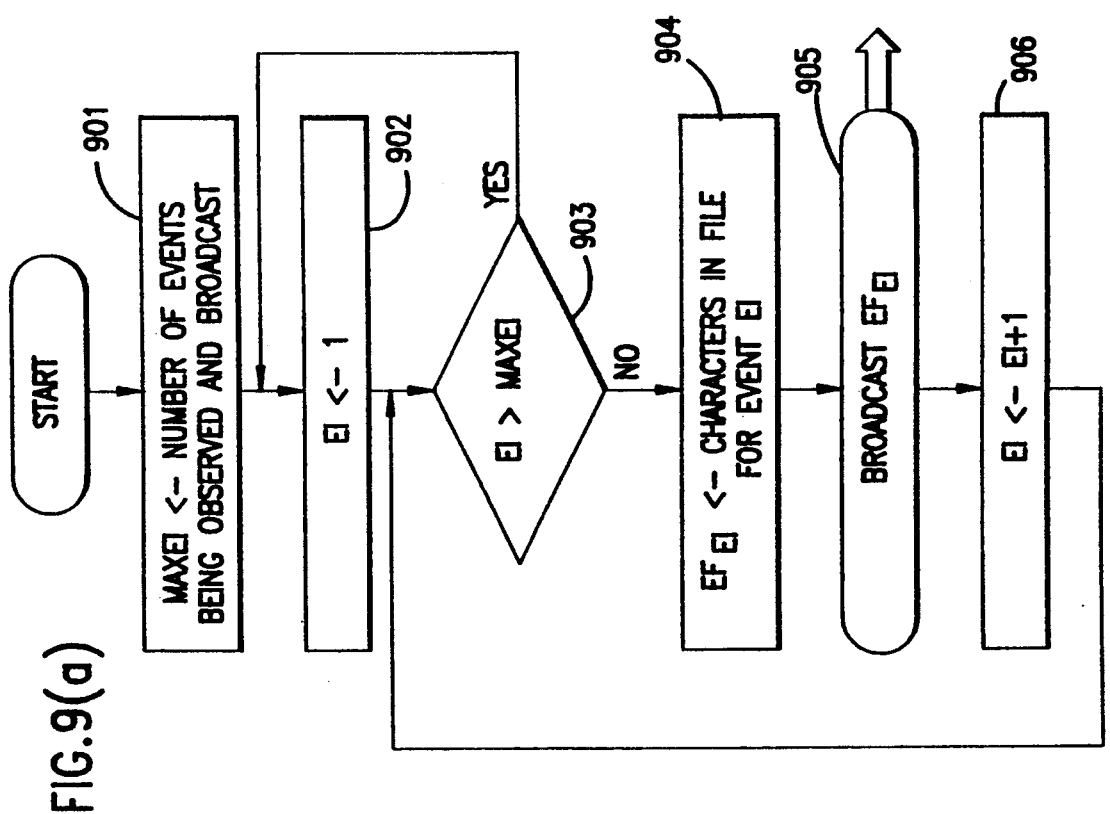

FIGS. 9(a) and 9(b) are flow charts illustrative of algorithms for the centralized data base computer and viewer's computer, respectively, for implementing a one-way communication. At step 901, the centralized data base computer defines the maximum number of events being observed and broadcast as a value MAXEI and then, in step 902 of FIG. 9(a), selects data base event file EI number 1. In decision step 903, the number of EI is compared to MAXEI. If EI is greater than MAXEI, the broadcast is repeated for EI number 1 at step 902. If the number assigned to EI is not greater than MAXEI, then the characters in the file $EF_{EI}$ corresponding to event EI are accessed in step 904. In step 905, the accessed characters of $EF_{EI}$ are broadcast and in step 906, EI is incremented by 1 and the decision step of 903 is repeated.

The viewer's computer waits for the next event file to be received, as indicated at step 910 of FIG. 9(b). Once a broadcast of characters in a data base file EF is received, as indicated at step 911, an event identifier EI is accessed at step 912. In step 913, a decision is made as to whether the viewer is actually viewing the event identified by EI. If not, the event file may be discarded and the viewer's computer returns to the wait state of step 910. However, if the viewer is viewing event EI, then the corresponding event file on the viewer's computer is updated at step 914 with the characters from file EF received from the centralized data base computer.

Figure 10:
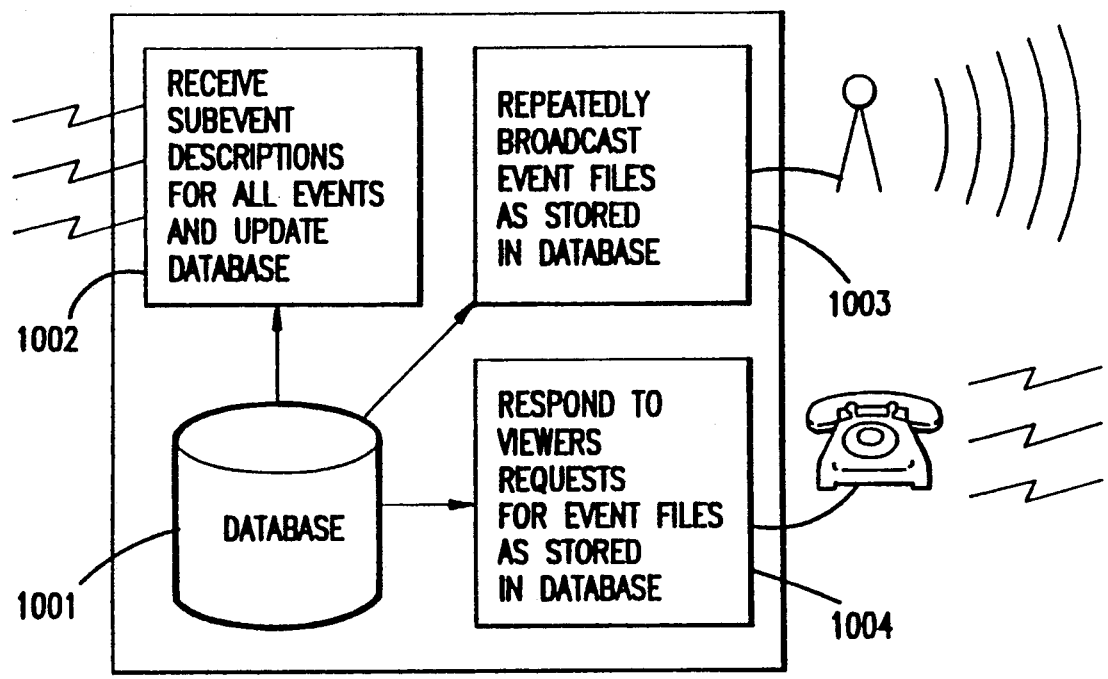
FIG. 10 illustrates in block diagram form, multi-processing in a centralized data base computer in accordance with the first embodiment of the present invention.

Regardless of the choice of algorithms for communication between the data base computer and the viewer, i.e., either one-way or two-way communication, the algorithms expressed in the flow charts FIGS. 7(a) and 9(a) as corresponding to the algorithms of the centralized data base computer, are best implemented in a multi-processing manner. In particular, FIG. 10 illustrates a schematic block diagram of a multi-processing operation on a centralized data base computer. Data base 1001 is capable of interacting with the observers' computers and carrying out one-way and two-way communications with viewers' computers. Process 1002 receives the subevent descriptions for all events and updates the data base of the centralized data base computer. Process 1003 repeatedly broadcasts event files stored in the data base according to a one-way communication scheme. Process 1004 carries out two-way communication between the centralized data base computer and a viewer by responding to viewers' requests for event files that are stored in the centralized data base computer.

The viewer's computer, regardless of the manner in which it receives information from the centralized data base computer, displays the encoded sequence of subevents associated with a particular event by using techniques derived from those used for discrete event simulation. Essentially, the viewer's computer performs at least two functions. First, it maintains a description of the status of the real event. Second, it shows each subevent received from the centralized data base computer in either a graphical representation or a textual representation or an audio/visual representation.

The status of the real event is stored as the values of a set of status variables. One status variable is used to store a current simulated time. A specific set of remaining variables to be used for any particular event depends on the nature of the event and the degree of detail which is desired. For example, a sporting event might include status variables for the names of the players, the current score, and information about the current game situation. Software on a viewer's computer includes a routine for displaying status variables. Depending upon the degree of sophistication desired, this may be as simple as a textual table, showing all status variables and their values, or it can be as complex as a graphical diagram in which the values of some status variables are indicated by pictorial icons on a background image, which suggests a view of the real event.

Figure 11:
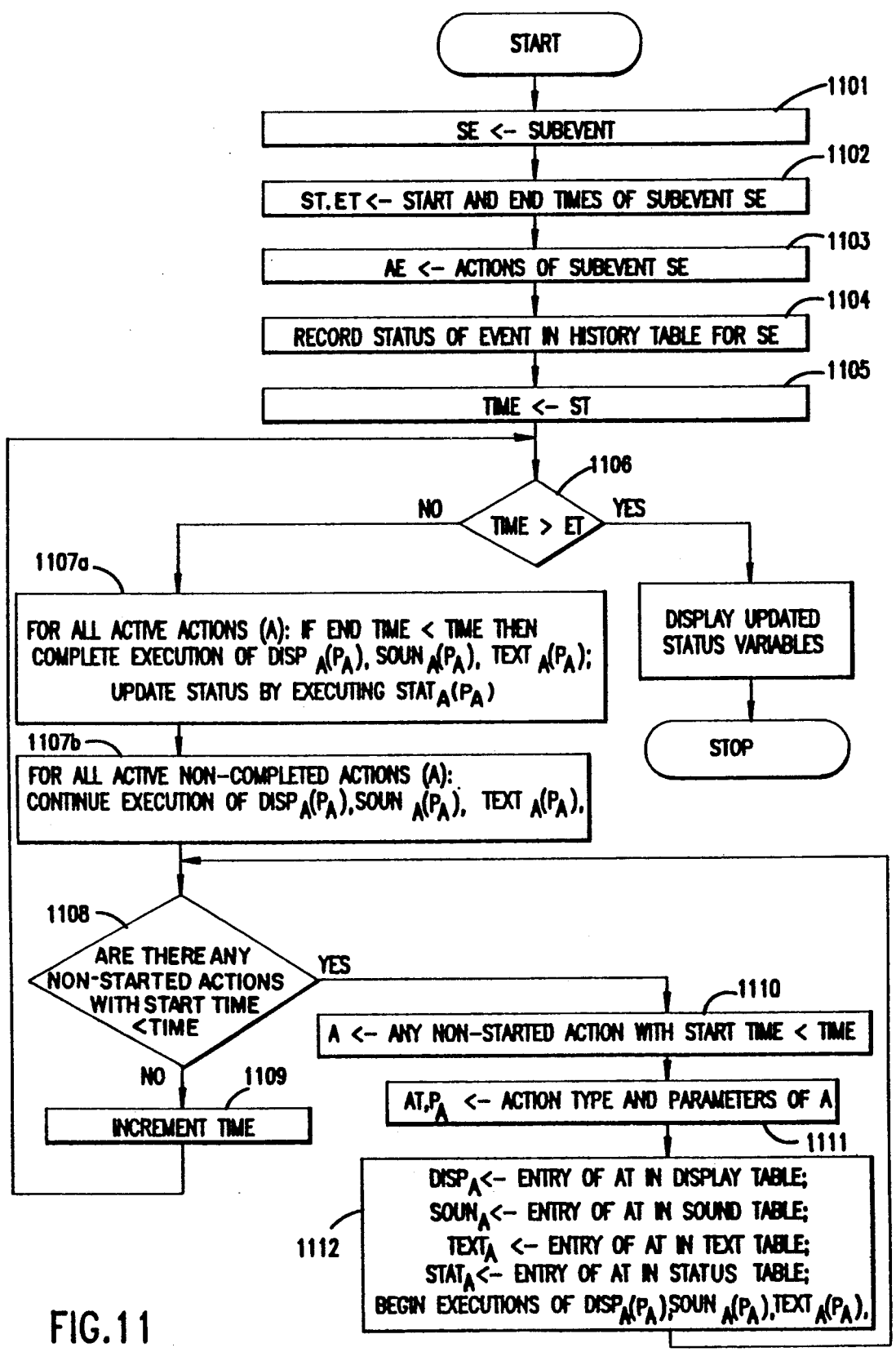
FIG. 11 is a flow chart representing an algorithm for simulation of subevents at a viewer location in accordance with the first embodiment of the present invention.

The algorithm in FIG. 11 relies on four tables, each indexed by the types of action that may occur. One table, the display table, has entries that describe how to display actions of that type. The second table, the sound table, has entries that describe how to generate appropriate sounds for actions of that type. The third table, the text table, has entries that describe how to produce a textual description of actions of that type. The entries in these three tables all describe procedures that can be executed incrementally for each step of the time variable. The fourth table, the status table, has entries that describe how actions of that type affect the status variables of the event. Entries in the tables rely on parameters associated with the action type. Entries in the display table also depend on the background image selected by the viewer. The algorithm also creates an entry in a fifth table, a history table, indexed by subevent number.

The central idea is to use the time status variable as a simulated clock. The clock variable is repeatedly incremented. Whenever the time variable exceeds the start time of one of the actions of the subevent, the simulation for that action is started. Whenever the time variable exceeds the end time of one of the actions that has been started, the simulation for that action is completed. Otherwise, all active simulated actions are continued for each step of the time variable.

FIG. 11 is a flow chart illustrating an algorithm by which the viewer computer handles display decisions with respect to a single subevent in a sequence of subevents which constitute an event.

Initially, at step 1101, the subevent is defined as SE. At 1102, the start time of SE is set as ST and the end time of SE is set as ET. The set of actions of SE is defined as AE in step 1103. The status of the event prior to SE is stored in the history table in step 1104. In step 1105, the status of the variable utilized to indicate time is updated in view of ST. In decision step 1106, the viewer's computer determines whether the time is greater than the designated end time of the subevent. If not then the algorithm proceeds to step 1107a, at which step for all active actions (A) where the end time has been exceeded the execution of $Disp_A(P)_A$, $Soun_A(P)_A$ and $Text_A(P)_A$ is completed and the status is updated by executing $Stat_A(P_A)$. For all active non-completed actions the execution of $Disp_A(P)_A$, $Soun_A(P)_A$ and $Text_A(P)_A$ is continued in step 1107b.

In step 1108 a decision is made as to whether there are any non-started actions that have a start time less than the designated time. If it is detected that there are no such actions, the time is incremented in step 1109 and the algorithm returns to the decision step of 1106. If there are any non-started actions detected at step 1108, one such action is identified in step 1110 and the action type and parameters of that action are identified in step 1111. The entries in the DISP, SOUN, TEXT and STAT tables corresponding to the action type are accessed and execution of $Disp_A(P_A)$, $Sound_A(P_A)$, and $Text_A(P)_A$ will begin in step 1112.

Figure 12:
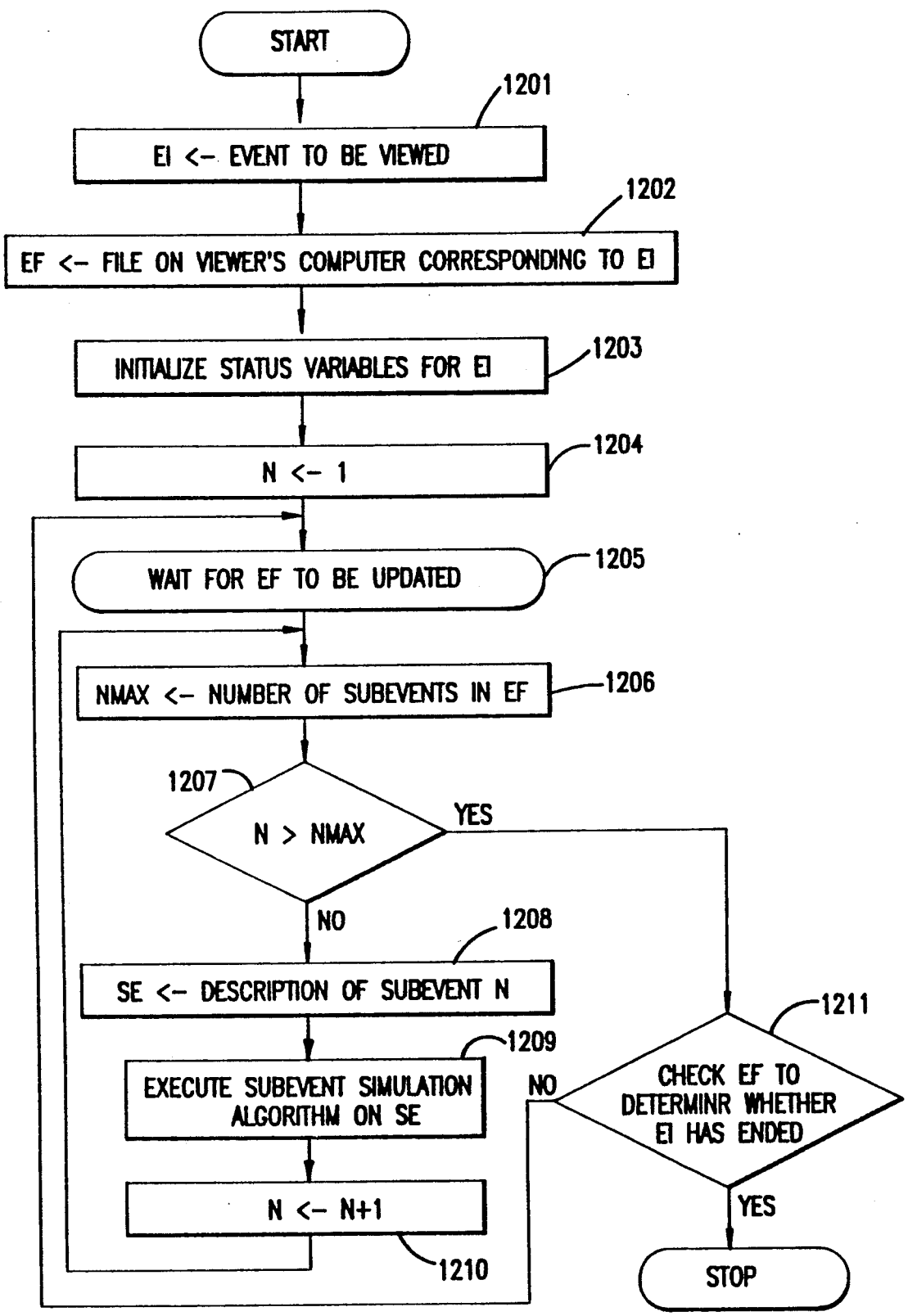
FIG. 12 is a flow chart representing a simulation algorithm for an entire event at a viewer location in accordance with the first embodiment of the present invention.

The simulation of an entire event is accomplished by repeating the basic algorithm for simulating a subevent as set forth in the flow chart of FIG. 11. A flow chart corresponding to an algorithm for complete event simulation is set forth in FIG. 12. At step 1201, EI is defined as the event which is to be viewed, while in step 1202, EF is defined as the file on the viewer's computer that corresponds to EI. In step 1203, the status variables for EI are initialized. A variable N is set to equal 1 at step 1204. The viewer's computer then waits for EF to be updated at step 1205. The variable NMAX is defined as the number of subevents in the updated file EF, as set forth in step 1206. In decision step 1207, the number N is compared to NMAX. If the value of N is not greater than NMAX, then a subevent description for subevent N is set, from file EF, as SE in step 1208 and the subevent simulation algorithm of FIG. 11 can then be executed with respect to SE as defined at step 1209. The variable N is then incremented by 1 at step 1210, and the decision step of 1207 is repeated. This loop is continued until the variable N exceeds NMAX, at which point a new decision step 1211 occurs, whereby the file corresponding to the event EF is checked to see whether the event has ended. If not, the algorithm returns to that portion which defines a WAIT operation, waiting for EF to be updated at step 1205. If the event has been concluded, then the simulation is concluded.

By using the basic subevent algorithm in a variety of different ways, the viewer's computer gives the viewer considerable flexibility. For instance, subevents may be viewed from different perspectives by changing the background image and letting the entries in the display table depend upon the background image, as discussed above. Also, the viewer's computer can display both textual information and simulation information simultaneously. For example, if a particular player such as George Bell were to come to bat in a certain subevent, it is possible to access a statistical database that will provide textual information regarding George Bell at some time prior to, during, or after the simulation of the subevent. The user can selectively activate this statistical searching procedure. In addition, any sequence of subevents may be re-simulated at any later time by restoring the status of the event from the history table and executing the algorithm of FIG. 11, starting with the first subevent to be re-simulated. Furthermore, the entire event or selected subevents may be simulated at a faster rate of speed, by simply displaying the status associated with a subevent after each subevent, rather than displaying all of the details of all of the actions associated with a given subevent. Furthermore, since an event is characterized in terms of digital codes, the transmission media will permit the user to access information regarding more than one event at a time. In this circumstance, the user can "freeze" or stop review of a first event and review portions or the entirety of a second event, or simply obtain status information about the second event. Once the viewer's curiosity about the second event is satisfied, the user can resume viewing the first event.

Just as the algorithms of the centralized data base computer will be best implemented utilizing a multiprocessing technique, so will the algorithms associated with the viewer's computer be best implemented by using a multi-processing technique. As illustrated in schematic block diagram form in FIG. 13, data base 1301 of the viewer's computer is capable of receiving update information and controlling the display of information to a viewer. In particular, process 1302 receives subevent descriptions from the centralized data base computer, and updates the data base 1301. The updated data base is then used to update the status and also to display subevents in accordance with the algorithms of FIG. 11 according to process 1303.

Figure 13:
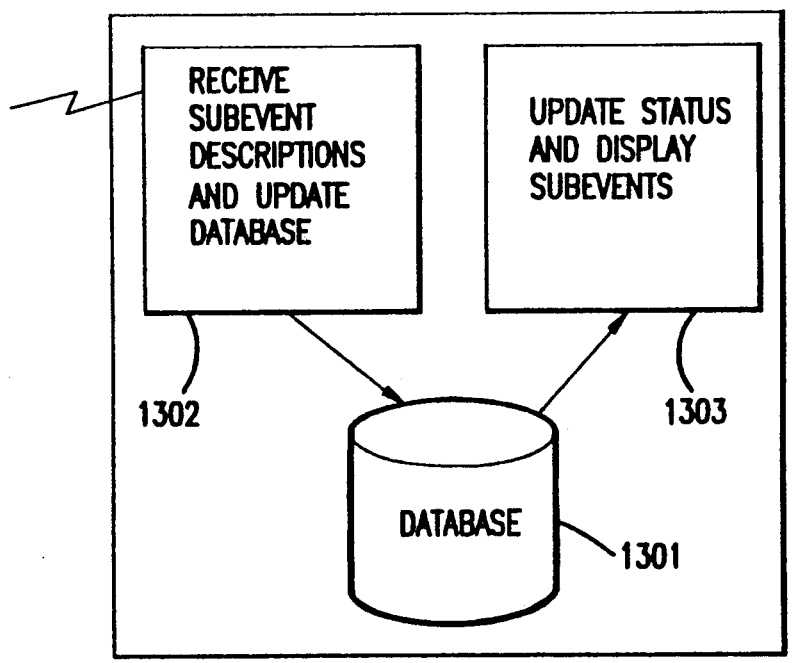
FIG. 13 illustrates in schematic form multi-processing on a viewer's computer in accordance with the first embodiment of the present invention.

The multi-processing techniques of FIGS. 10 and 13 are familiar to those skilled in the art of discrete event simulation techniques.

It will be possible to run the software for viewing the event on either a general purpose computer or a special purpose computer. The viewer computer may also take the form of a portable, or pocket-sized computer that will have the full functional capability of presenting the broadcasted live event as video images, audio images, or text or some combination thereof since the algorithms for the viewer computer that are described above could also be implemented by a pocket sized computer employing a microprocessor or microcomputer that is provided with appropriate software. The pocket sized computer could have a display capable of showing the simulation of the event in much the same manner as a personal computer screen.

As an example to illustrate the broadcast method of the present invention, the application of the method to a half inning of a baseball game will now be described. The actions of the half inning are as follows:

At the end of the eighth inning, the home team is ahead of the visiting team by a score of 3-1. During the top of the ninth inning, the first batter for the visitors will ground out, but the next batter will walk, steal second, and score on a close play at home after the third batter singles. The fourth batter strikes out. The fifth batter will hit a long fly ball, deep to left field. If it goes out of the park, two runs will score and the visitors will take the lead, but it is finally caught at the wall by the left fielder, and the home team wins the game.

Some of the action types that appear in this example are described below in Table I with the parameters.

TABLE I

| | |
|---|---|
| Strike | (no parameters) |
| Ball | (no parameters) |
| GroundBall | Location |
| FlyBall | Location |
| ForceOut | Base, Runner, Fielder |
| StolenBase | Runner, Base |
| FieldedBall | Fielder, Location |
| CaughtFlyBall | Fielder, Location |
| ThrownBall | Thrower, Receiver |
| RunToBase | Runner, Base |

A portion of the textual representation of the game is give below. The subevents correspond to the first batter.

```
Game 1428 True 238
    ... subevents prior to beginning of ninth inning
{178 15:47:15:47:16
    [0:00:00 0:00:01 Ball] }
{179 15:47:30 15:47:34
    [0:00:00 0:00:03 GroundBall LeftInfield ]
    [0:00:01 0:00:04 RunToBase Batter FirstBase ]
    [0:00:03 0:00:03 FieldedBall Shortstop ]
    [0:00:03 0:00:04 ThrownBall Shortstop
    FirstBaseman]
    [0:00:04 0:00:04 ForceOut FirstBase Batter
    FirstBaseman]}
```

"Game 1428" is the unique identifying code for this particular baseball game; "True" indicates that the game is still in progress; "238" indicates there have been 238 subevents so far. Subevent 178 lasted only 1 second and consisted of a single action, namely, the pitcher throwing a ball. Subevent 179 lasted for 4 seconds, and consisted of 5 actions; the batter hitting the ball on the ground in the left infield toward the shortstop (3 seconds), the batter running toward first base (3 seconds), the shortstop fielding the ball (0 seconds), the shortstop throwing the ball to the firstbaseman (1 second), and the batter being forced out at first base by the firstbaseman (0 seconds).

As described above with respect to the algorithm in FIG. 3, the observer could type in all of this information when prompted by the observer's computer. Alternatively, the computer could have special codes for commonly occurring subevents. For example, to record the second subevent for the first batter (subevent 179 in this example), the observer could simply indicate that the batter grounded out to the shortstop. The computer could then refer to a table of standard plays and automatically construct the actions indicated above.

For simulation on the viewer's computer, the status of the example baseball game consists of 11 status variables. These variables are given in Table II, along with an indication of how they could be displayed on the viewer's computer.

TABLE II

| | |
|---|---|
| Time | Graphical depiction of a clock with the current time |

TABLE II-continued

| | |
|---|---|
| HomeScore | Textual entry at a specific location |
| VisitorScore | Textual entry at a specific location |
| InningNumber | Textual entry at a specific location |
| TeamAtBat | Textual entry at a specific location |
| Outs | Textual entry at a specific location |
| Balls | Textual entry at a specific location |
| Strikes | Textual entry at a specific location |
| RunnerOnFirst | Graphical depiction of a player on first base |
| RunnerOnSecond | Graphical depiction of a player on second base |
| RunnerOnThird | Graphical depiction of a player on third base |

Figure 14:
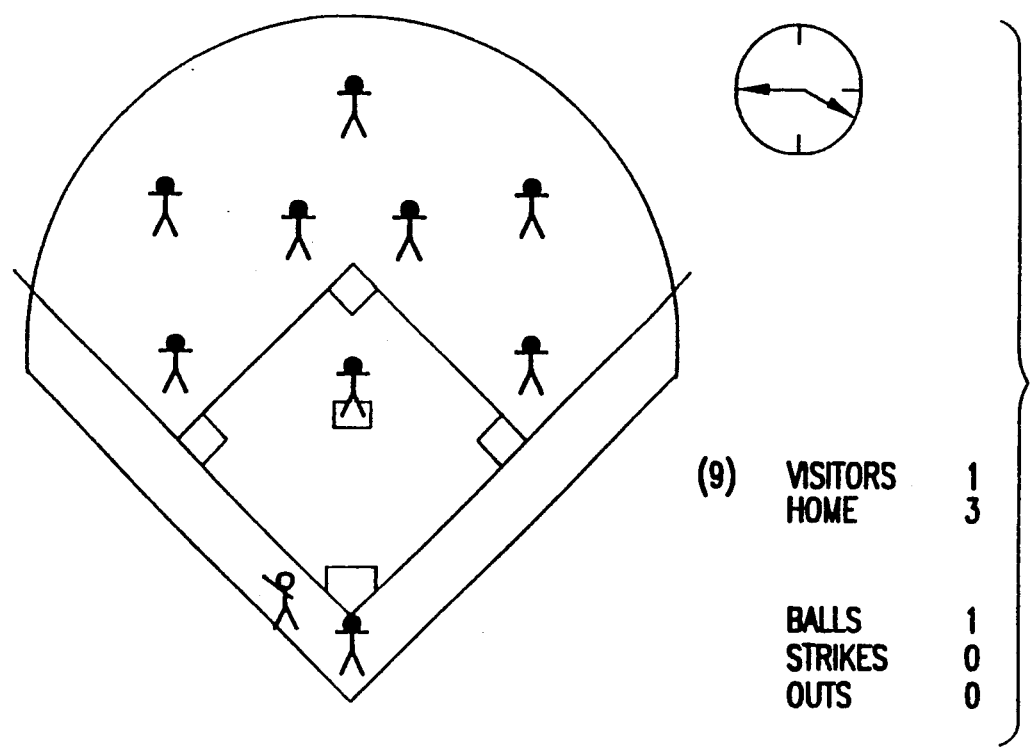

For example, FIG. 14 shows the viewer computer screen after subevent 178 of the example game.

Figure 15:
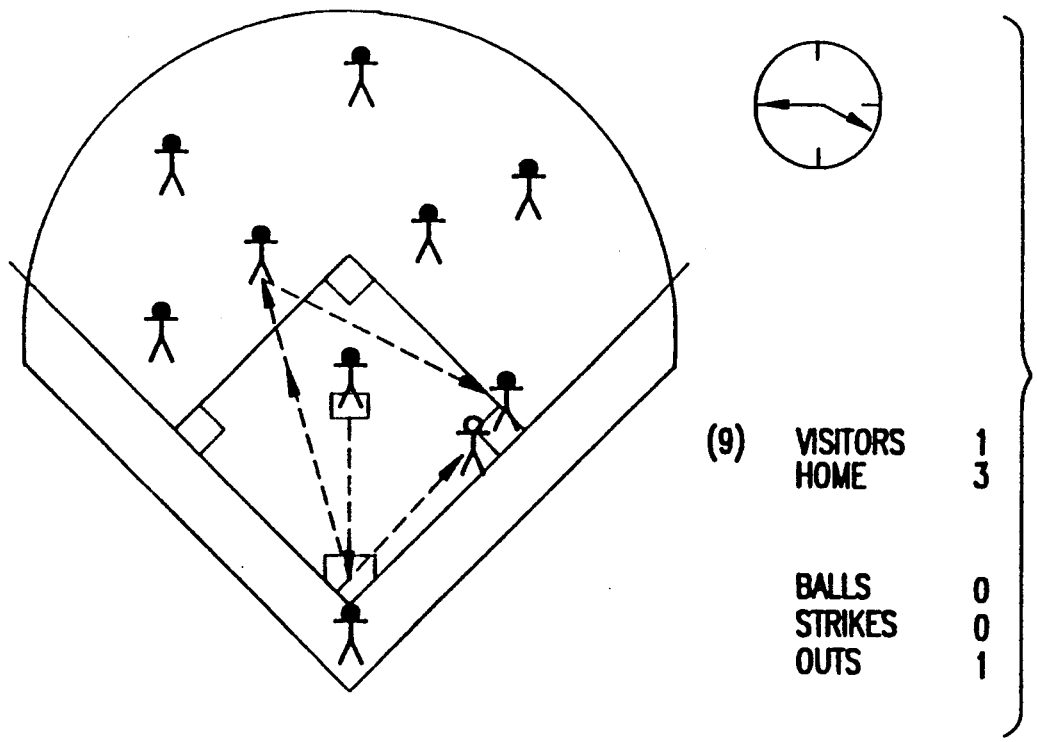

FIG. 15 shows the viewer computer screen after subevent 179. The dashed arrows indicate motions (of the ball or of players) that occurred to simulate the various actions of the subevent.

The last subevent of the inning illustrates the use of the display, sound, and text tables. The subevent would be represented textually as follows:

```
{196 15:53:30 15:53:40
    [ 0:00:00 0:00:07 FlyBall DeepLeftOutfield ]
    [ 0:00:01 0:00:04 RunToBase Batter FirstBase ]
    [ 0:00:01 0:00:04 RunToBase FirstRunner
    SecondBase]
    [ 0:00:04 0:00:07 RunToBase Batter SecondBase ]
    [ 0:00:04 0:00:07 RunToBase FirstRunner ThirdBase]
    [ 0:00:07 0:00:07 CaughtFlyBall DeepLeftOutfield
        LeftFielder ] }
```

The tables for the relevant action types are as follows:

| | FlyBall (Location) |
|---|---|
| Disp: | swing bat; move ball from home plate toward Location |
| Text: | if Location is deep, then "it's a long fly ball, deep to Location . . ." |
| Soun: | crack sound of wood on ball; if Location is deep, and batter is visitor, then gasp and silence |
| | RunTowardBase (Runner, Base) |
| Disp: | move Runner toward Base |
| Text: | (no entry) |
| Soun: | (no entry) |
| | CaughtFlyBall (Fielder, Location) |
| Disp: | move Fielder to Location, move ball to Location |
| Text: | "caught by Fielder" |
| Soun: | if Location is deep, and batter is visitor, then loud cheers |

FIG. 16–19 show the viewer's computer display, text, and sound output at various times during the simulation of subevent 196.

Figure 16:
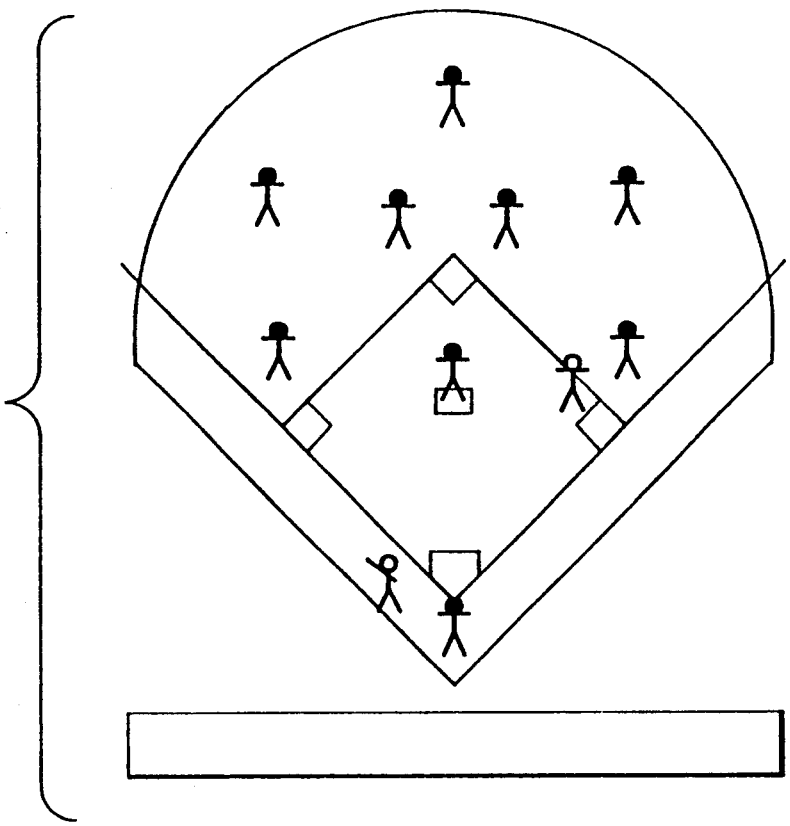

FIG. 16 illustrates the viewer computer display prior to subevent 196.

Figure 17:
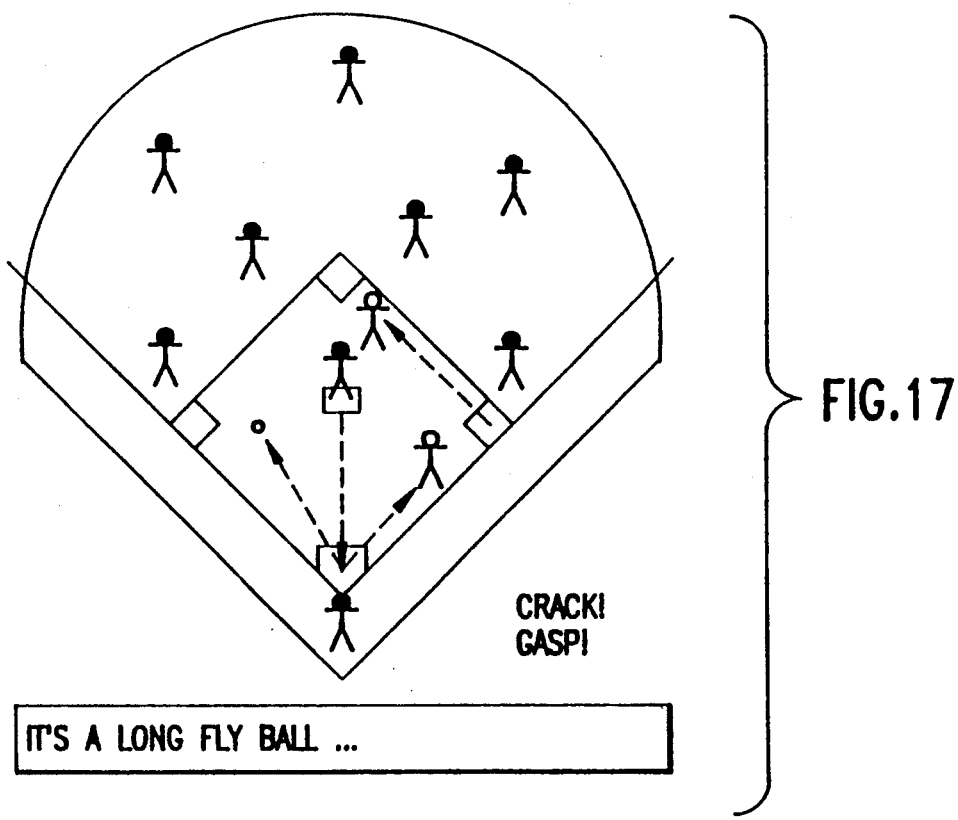

FIG. 17 illustrates the viewer computer display 2 seconds after the subevent begins.

FIG. 18 illustrates the viewer computer display 5 seconds after the subevent begins.

FIG. 19 illustrates the viewer computer display 7 seconds after the subevent begins.

Second Embodiment

In a method according to the second embodiment of the present invention, the encoded description of the event includes status information in its representation of subevents. In addition, the encoded description is combined with other signals such as an audio signal or a video signal to produce a combined signal that is transmitted to a viewer with a computer. The encoded description portion can then be used by the viewer to detect information about the occurrence of certain subevents of interest. Alternatively, the viewer may record the entire event and then search through the recording quickly for subevents of particular interest using the encoded description with a computer pattern-matching scheme. The remainder of the drawing figures of the application are related to this method and are described in greater detail below.

FIG. 20 illustrates an overview of an encoding and broadcast method according to a second embodiment of the present invention. As described above, the observer 21 encodes an event using computer 22 to produce an encoded description 23. Other signals 24, such as audio signals or video signals can be produced by conventional methods. The encoded description and the other signals are combined resulting in the combined signal 25. That combined signal is transmitted by transmitter 26 to a viewer receiver. The viewer receiver is then monitored by the viewer 28. The viewer's receiver may include computer hardware and software in computer 27 to notify the viewer about subevents of interest using the encoded information from the combined signal. In addition, the viewer may record the transmitted combined signal for later viewing on a device which includes computer hardware and software which will enable the viewer to locate subevents of interest using the encoded information of the combined signals. In the example described in more detail below, the observer and the observer's computer are at a baseball stadium and the other signals are those provided for a television representation of the live event.

FIG. 21 provides a textual representation of a subevent. This figure is quite similar to FIG. 2 in that it indicates that a subevent description includes designation of a subevent number, a start time of that subevent and an end time of that subevent, as well as a string of descriptions of the actions which constitute that subevent, where each action description includes a start time and a stop time for the action as well as an action type designation, and parameters and parameter values for each action where appropriate. FIG. 21 differs from FIG. 2 in that it further includes status variable designations and status values which further describe the subevent. This description of the status of the event may consist of the values for all of the status variables immediately after the subevent has occurred.

The amount of information contained in the subevent description of FIG. 21 is relatively small and is typically no more than a few hundred characters, depending on the nature of the event.

FIGS. 22A to 22D illustrate a textual representation of examples of subevents in the general example of events during a baseball game.

FIG. 22A provides a description of subevent no. 4 which begins at 1:45:30 and ends at 1:46:45. The status of the event after subevent no. 4 is indicated in that the home score and the away score are both "0" in inning "1" with "0" outs. The status variables further indicate that the team at bat is the "away" team and identifies the player at bat as Al Pedrique. Finally, the remaining status variables provide an indication that there are no runners on either first or second base, but that George Foster is on third base. These are all indications of the status of the event after the subevent action which appears in brackets following the status indication, that subevent consists of a triple to right field.

FIG. 22B provides a textual representation of the start time and end time of the next subevent, subevent 5, as well as the status after that subevent occurs, together with a description of the actions which occur during that subevent. Those actions include a sacrifice bunt and the advance of the runner from third base to home base. The status variables have changed to the extent that the away score has now changed and the number of outs has changed.

FIGS. 22C and 22D show textual representations for subevent nos. 6 and 7 of the event, with information about the status variables after each subevent and a description of those subevents. Subevent no. 6 is a strike out by Wade Boggs that brings Bo Jackson to bat as represented in FIG. 22C while subevent no. 7 of FIG. 22D is a home run to right field by Bo Jackson that brings Jose Canseco to bat.

In the second embodiment, the encoded description of the subevents can be created using either of two basic techniques. Under a first technique, the observer simply enters the encoded descriptions of the subevents into the on-site computer as they occur. If a textual representation is being used as described above, the observer would type the characters representing each subevent. This technique is feasible but may be difficult for the observer.

A better technique is to use special-purpose software to assist the observer. The software, for example, could provide a menu of possible action types and then prompt the observer for the relevant parameters after the action type is selected.

Figure 23:
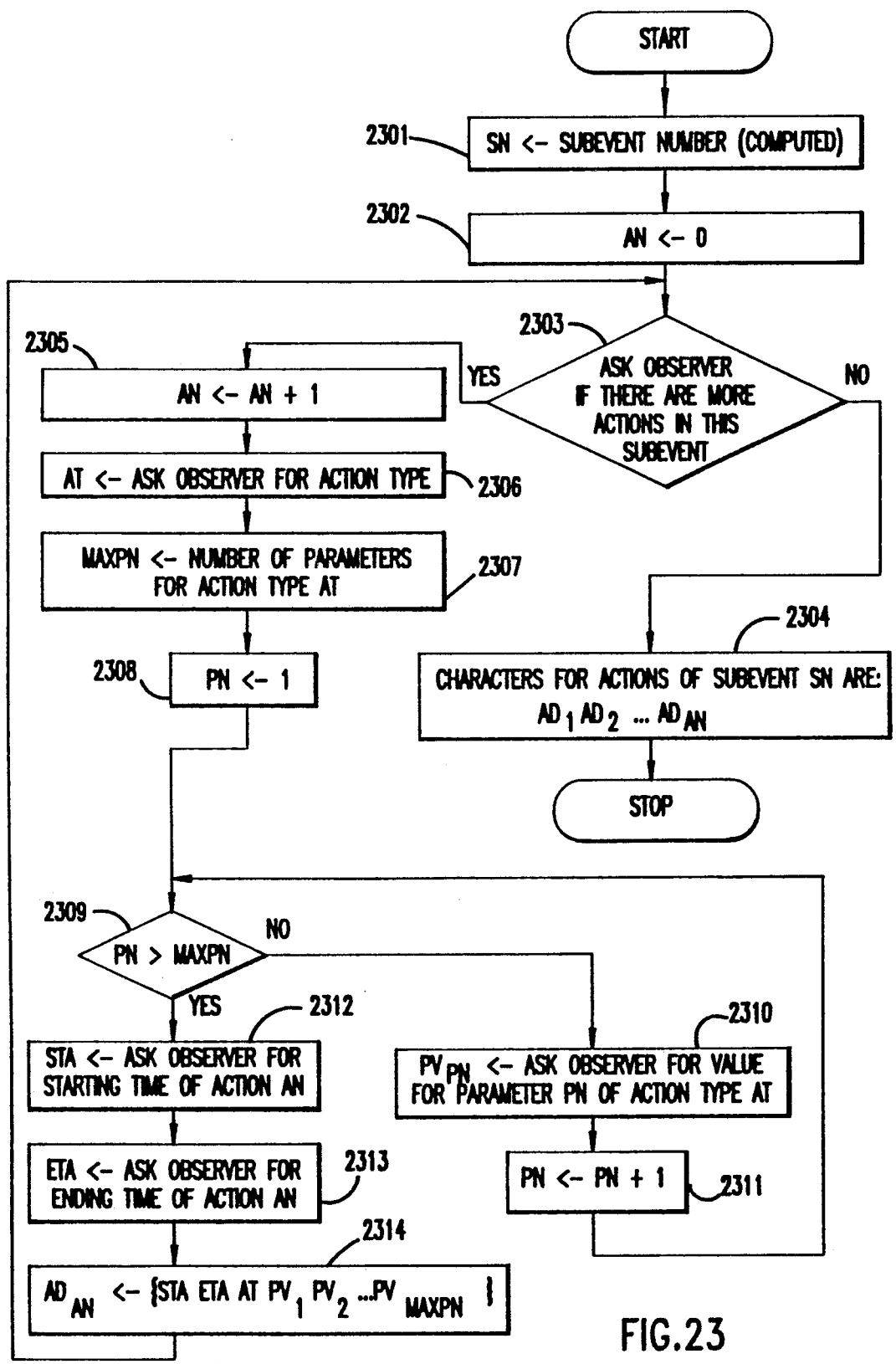
FIG. 23 illustrates an algorithm for recording the actions of a subevent in the second embodiment of the present invention.

FIG. 23 illustrates an algorithm for recording the actions of a subevent in which this special-purpose software is utilized to record the action descriptions. This algorithm is similar to the algorithm illustrated in FIG. 3 with respect to the first embodiment. The exception is that FIG. 23 does not include steps corresponding to steps 302 and 303 of FIG. 3 which require that the observer be asked for the subevent's start and end time, respectively. Otherwise, the subevent number is first computed at step 2301 and the variable AN representative of the action number is initialized in step 2302 The observer computer then asks the observer if there are any more actions in this subevent at decision step 2303 If the answer is no, then the characters for the actions of the subevent are set at 2304 and the operation stops. If there are more actions in the subevent, then the action number is incremented by one in step 2305 and the observer is prompted to provide an action type in step 2306. The number of parameters for such an action type is then stored at MAXPN in step 2307 and PN is set to one in step 2308. In step 2309 a decision is made as to whether PN is greater than MAXPN. If the answer is no, then in step 2310 the computer asks the observer to provide a value for parameter PN of action type AT and then PN is incremented by one at step 2311 and the decision step of 2309 is repeated. If the decision ultimately indicates that PN is greater than MAXPN, then the observer asks for the starting time of action AN in step 2312 and the end time for that action in step 2313.

Finally, an action descriptor for a given action number is set at step 2314 including the start and end times (STA and ETA), the action type (AT) and the parameter values ($PV_1$; $PV_2$...$PV_{MAXPN}$) for that action type. Then the computer again prompts the observer seeking whether there are more actions in the subevent in decision step 2303.

Figure 24:
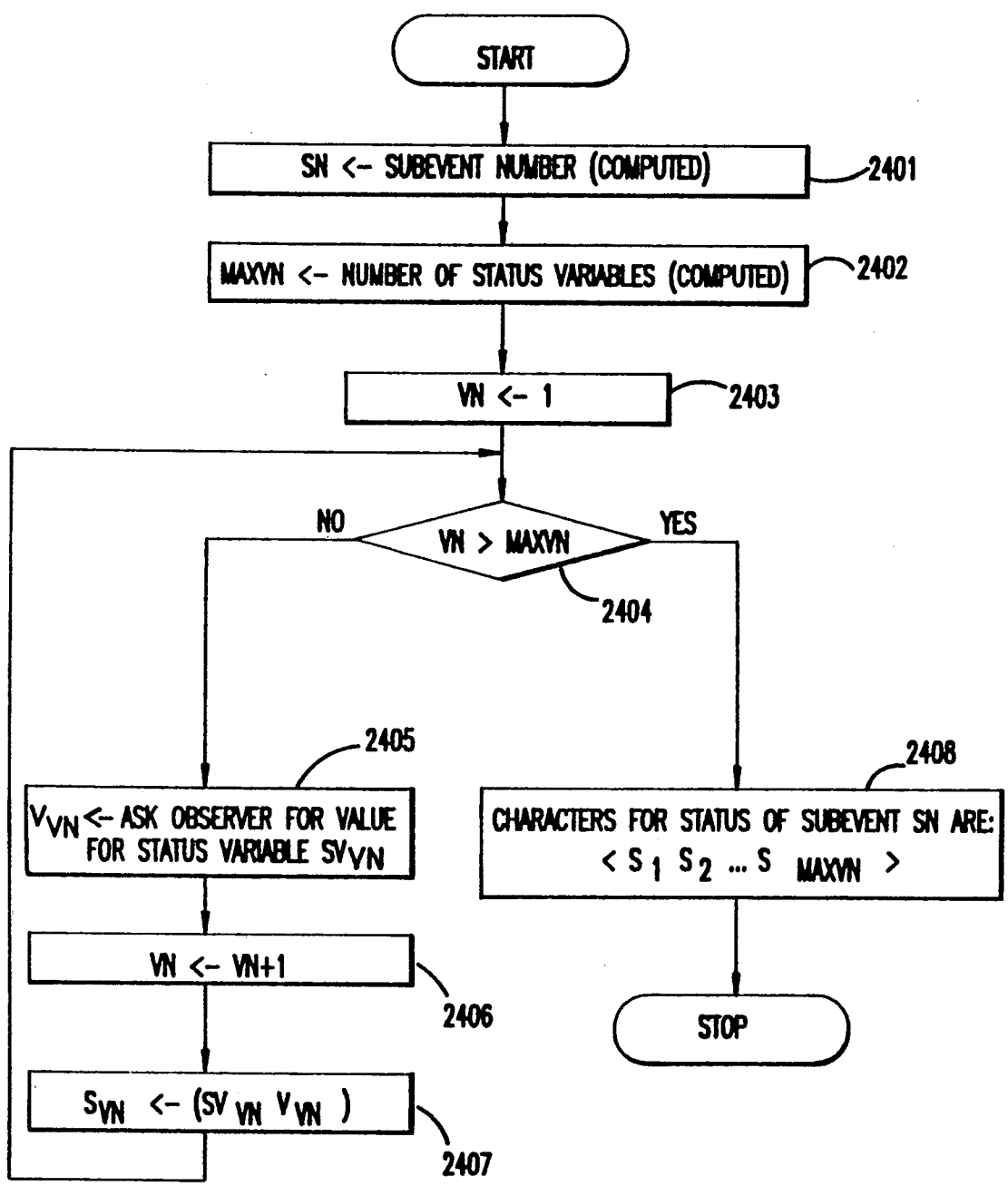
FIG. 24 illustrates an algorithm for recording the status of a subevent in accordance with a second embodiment of the present invention.

FIG. 24 illustrates an algorithm implemented by software in the observer's computer to record the status variables relating to the status of a subevent. First, in step 2401 the subevent number is computed by the observer's computer. The maximum status variables are also computed at step 2402. The variable VN is set to a value of one at step 2403, thereby initializing the process. At decision step 2404, VN is compared to MAXVN. If VN does not exceed MAXVN, then the computer asks the observer for value for status variable $SV_{VN}$ in step 2405. This is entered as $V_{VN}$. The value VN is then incremented by one in step 2406 and the information defining the status variables for $S_{VN}$ is set in step 2407. Then the decision step of 2404 is repeated. This loop is continued until VN exceeds MAXVN at which point the characters for the status of the subevent SN are set as shown in step 2408 and the algorithm ends.

As described above with respect to the first embodiment, it is possible that the observer's computer could also employ graphically-oriented techniques to further support the observer. In particular, if a required parameter is the name of a participant of the event, the software could prompt the observer with a complete list of participants and ask the observer to select one. As another example, if a required parameter is a location on the playing field, the software could provide a diagram of playing field and ask the observer to use a pointing device, such as a mouse, to point to the relevant location on the diagram. As indicated above, techniques for developing such software are well known.

In accordance with the second embodiment, it is also possible for the observer's computer to actually calculate status variable values directly from the action descriptions instead of requiring the observer to record the status variables. This calculation scheme requires that a status table be provided and that the status table be indexed according to the types of actions that may occur. The table will have entries that describe how actions of that type affect the various status variables of the event. Entries in the table may rely on parameters associated with the action type.

Figure 25:
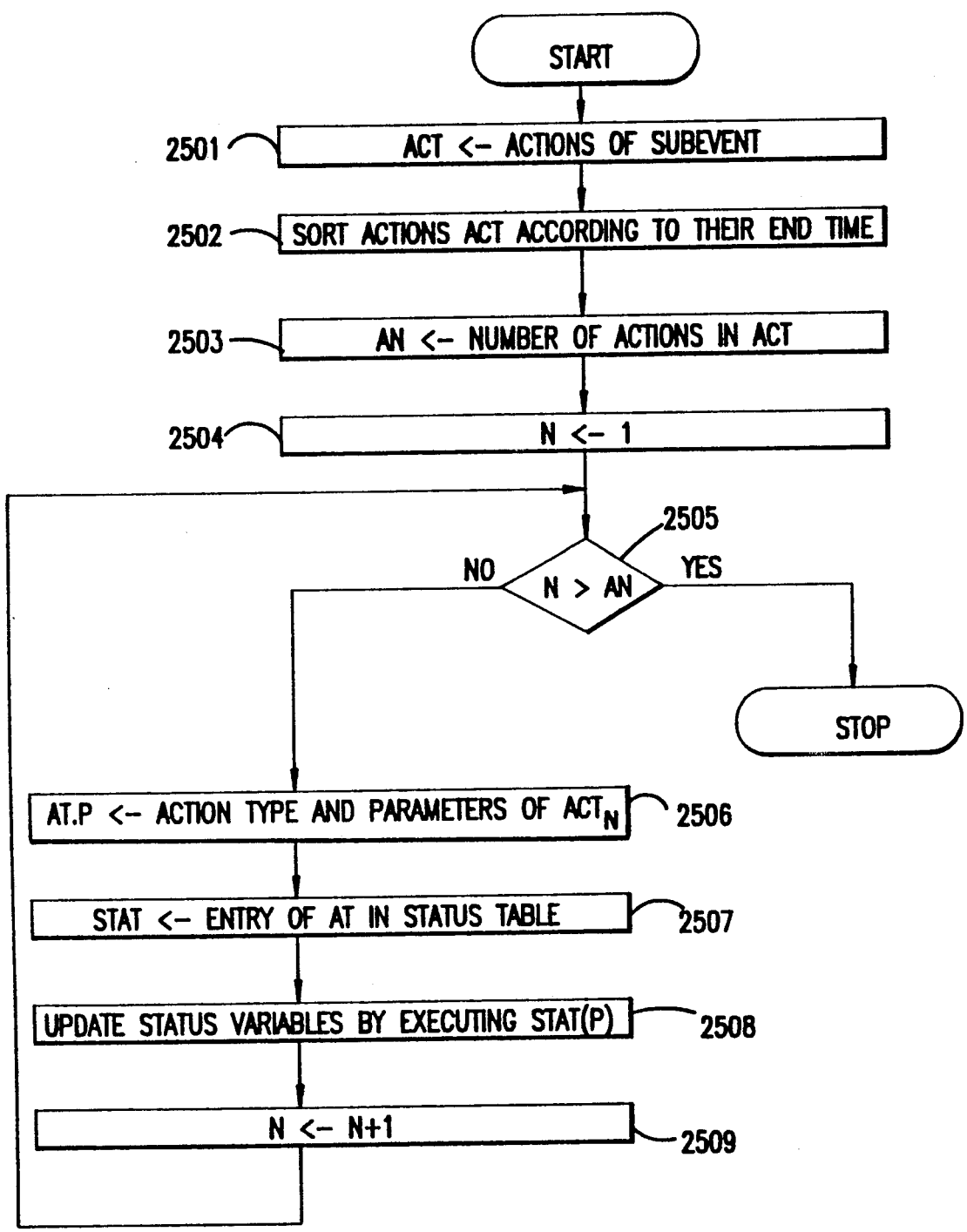
FIG. 25 illustrates an algorithm for computing the status of a subevent in accordance with the second embodiment of the present invention.

FIG. 25 illustrates an algorithm provided in software which can be used with such a status table to compute values for the status variables. In step 2501, the actions of the subevent are provided. Those actions are sorted according to their respective end times at step 2502 and the number of actions of the subevent are stored as AN in step 2503. In step 2504, the variable N is initialized to one. In decision step 2505, the value of variable N is compared to the value AN. If N does not exceed AN, then the action type and parameters of ACT are provided to AT,P in step 2506. The entry of AT in the status table is provided to Stat in step 2507 and the status variables are updated in step 2508 by executing Stat(P). N is then incremented by one at step 2509 and the decision step of 2505 is repeated. This loop is repeated until N exceeds AN at which point the algorithm is completed. Thus, the repeated execution of status table entries in conjunction with the various action types that define the subevent in the order that the subevents have been sorted according to their end time defines changes in the status variables throughout the activity in the subevent. When the subevent is completed after the last action has occurred, the update of the status variables is also completed.

Figure 26:
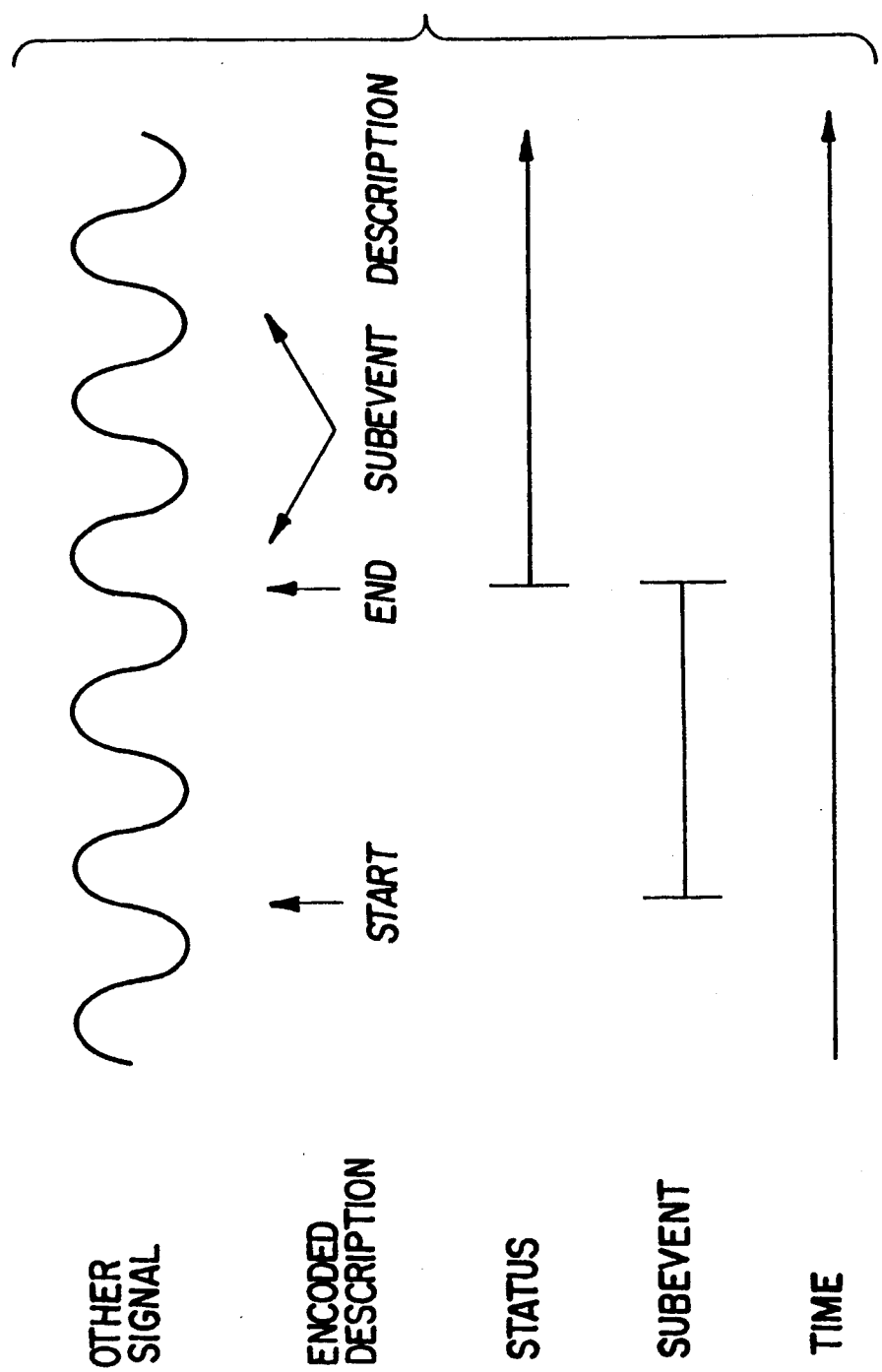
FIG. 26 illustrates a timing chart for signal and subevent description according to the second embodiment of the present invention.

As illustrated in FIG. 26, the encoded description of the event may be combined with other signals such as audio or video signals before being transmitted to a viewer. The basic idea is to add identification marks at the start and end of each subevent and to add the entire subevent description immediately after the end of the event. This is illustrated in general in FIG. 26 which illustrates a timing chart for the signal and subevent description. The other signal is provided in parallel with the encoded description. The subevent is indicated by a start and an end signal provided in the encoded description corresponding to the start and end time of the subevent. After the subevent ends, as represented by the end time marking in the encoded description, a subevent description is provided in the encoded description. Furthermore, after the subevent has been completed, the status of the event is set until the next subevent occurs.

Figure 27:
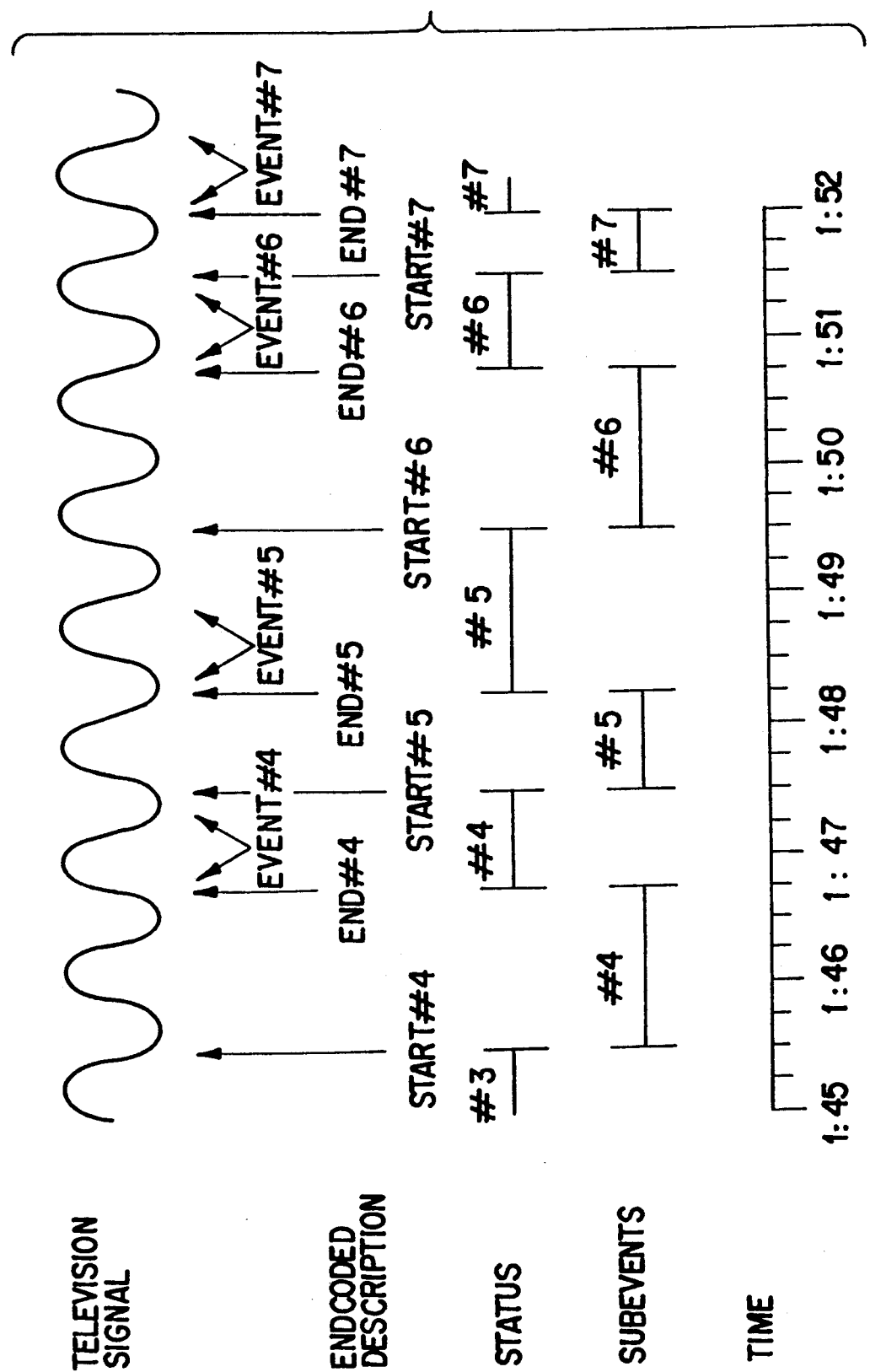
FIG. 27 illustrates a timing chart corresponding to the example subevents of FIG. 22.

FIG. 27 illustrates a timing chart representative of the example subevents of the second embodiment of the present invention relating to the four subevents referred to in FIG. 22. At time 1:45:30, subevent no. 4 starts and this is marked as start #4 in the encoded description. At time 1:46:45, subevent no. 4 ends and is marked by end #4 in the encoded description. After subevent no. 4 has been completed, the status resulting from the occurrence of that subevent is set until the start of subevent no. 5 as shown in the status line. Furthermore, after the end #4 indication in the encoded description, the description of subevent no. 4 is provided in the combined signal. That description precedes the indication at time 1:47:30 of the start time of the event #5 which continues until 1:48:25 which is marked by an end #5 signal in the encoded description. This continues for the description of the subevent number 5 as well as the start time and end time and the event descriptions for subevent numbers 6 and 7 as further illustrated in FIG. 27.

The best technique for physically adding the coded description to the other signal depends on the broadcast medium. For example, with the conventional television signal, the encoded description information can be broadcast during the "vertical blanking interval" between images or, it can be broadcast with the second audio signal sometimes used for stereo/television broadcasting. Since the amount of information in the encoded description is so small (a few hundred characters) it can even be broadcast in place of a single screen image with only a minor flicker apparent to the viewer. When the broadcast medium is cable television, any of these techniques can be used, or the encoded information can be broadcast on a separate cable channel. Where symbolic broadcasting is used to produce computer simulations as described with respect to the first embodiment set forth above, the subevent description includes all of the action descriptions so that only status information needs to be added with the subevent description.

Subevents and actions may be characterized by using computer pattern-matching techniques. There are three primitive types of patterns. One type is an action pattern, which consists of a tag, indicating the type of action and descriptions of values for the parameters of the given action type. The specific action types, as well as parameter value descriptions, depend on the details of the nature of the event being broadcast. Action patterns are used to characterize subevents that include actions that match the pattern.

The second primitive pattern type is a status pattern, which consists of a status variable and description of values for that variable. The specific status variables, as well as value descriptions, depend on the details of the nature of the event being broadcast. Status patterns are used to characterize subevents whose status at the start or end includes a variable that matches the pattern.

The third primitive type of pattern is the status change pattern which consists simply of the name of a status variable. Status change patterns are used to characterize subevents which cause a change in the indicated variable.

Examples of the primitive pattern types are illustrated in FIG. 28A. In particular, string i, illustrates an action pattern which includes the action type and the descriptions of the values for the parameters of that action type. Strings 2, and 3, illustrate status patterns which include a status variable and a description of the value for that status variable either before a subevent or after a subevent in string 2, and 3, respectively. Finally, string 4, represents the third primitive type of pattern, i.e., the status change pattern, which includes the status variable of interest.

Composite patterns consist of BOOLEAN combinations of the primitive pattern types. Specifically three BOOLEAN operators may be used: negation, conjunction and disjunction. A negation is used to characterize a subevent which does not match the negated pattern. A conjunction is used to characterize a subevent that matches all of the conjoined patterns. A disjunction is used to characterize a subevent which matches any of the disjoined patterns. The patterns that occur within the BOOLEAN patterns may themselves also be composite patterns. Examples of composite patterns are illustrated in FIG. 28B where string 1, represents the negation pattern indicated by NOT, string 2, represents the conjunction pattern represented by AND string 3, represents the disjunction pattern represented by OR.

Examples of subevents of interest and textual representations of such subevents in the example of the second embodiment related to baseball are illustrated in FIG. 29. String 1 indicates that the viewer is interested in any subevent in which the status of the home score changes or the status of the away score changes. String 2 represents an interest in any subevent where the action includes a home run to any field. Finally, string 3 represents the desired subevent where Al Pedrique is at bat, i.e., that is before the subevent of his at bat is completed, and either a player is on second base or a player is on third base, i.e., whether there are any runners in scoring position.

The viewer's computer includes software that allows the user to characterize subevents of interest by specifying such patterns. While it is possible for the viewer to type the characters of the patterns directly, it is more effective for the computer to include special-purpose software at the viewer end to support the viewer.

Figure 30:
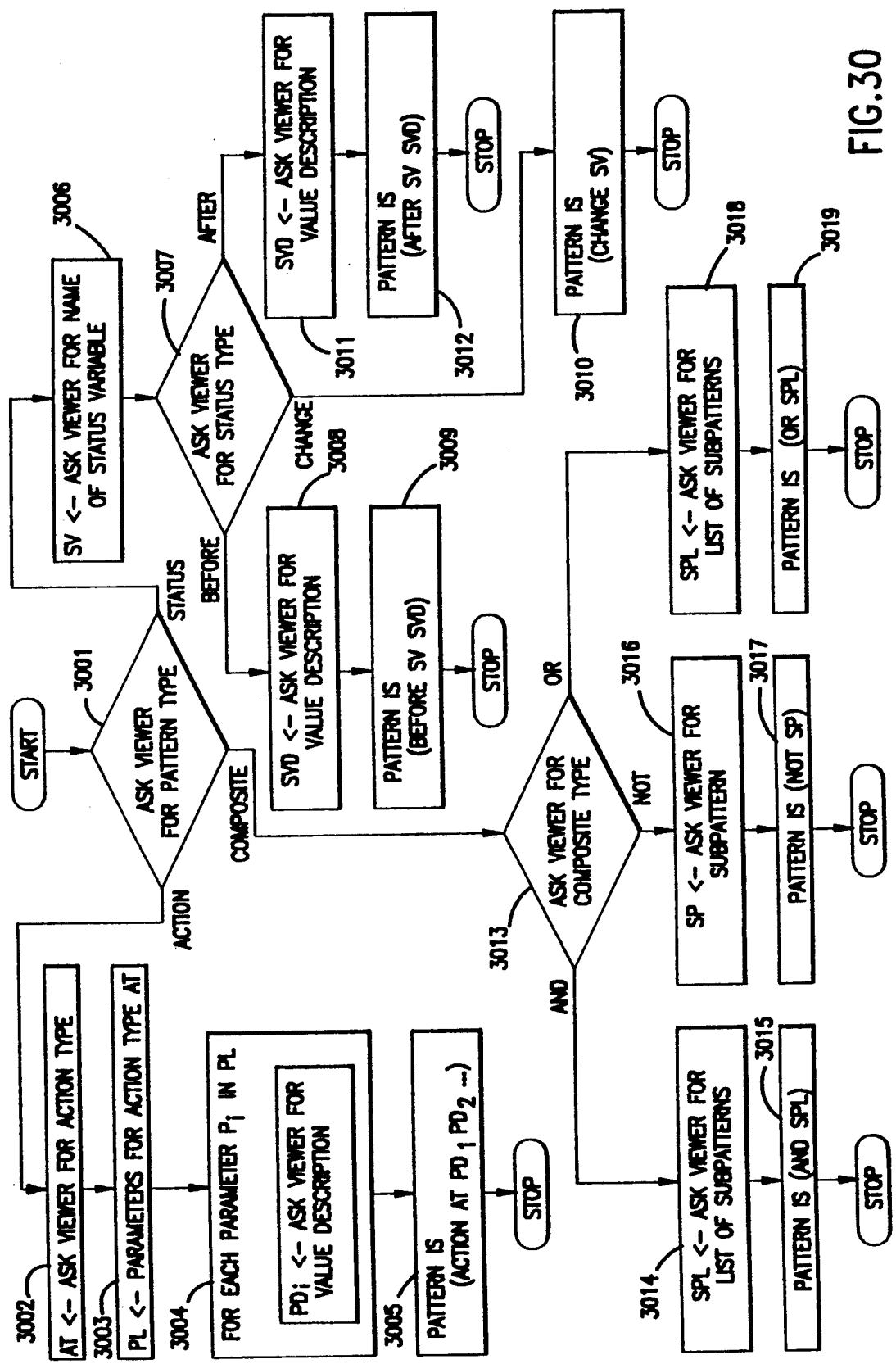
FIG. 30 illustrates an algorithm for accepting a subevent pattern from the viewer in accordance with the second embodiment of the present invention.

FIG. 30 illustrates an algorithm which supports the viewer for entering a subevent pattern indicative of a subevent of interest. In step 3001, the viewer is asked to identify whether the pattern type is an action pattern type, a composite pattern type or a status pattern type. If it is an action pattern type, then the computer asks the viewer to set forth the action type in step 3002 and the parameters for the action type designated by the viewer are provided to register PL in step 3003. For each parameter, $P_i$ in register PL, the computer asks the viewer for a corresponding parameter value description $PD_i$ in step 3004. The pattern is then defined in step 3005 as ACTION identified by the action type AT and the parameter values $PD_1, PD_2 \ldots$.

If the viewer identifies the desired pattern type as a status pattern, then the computer asks the viewer to name the status variable and that is set as SV in step 3006. The computer then asks the viewer for the status type either "before," "after" or "change" in step 3007. If the viewer selects "before," the computer then asks the viewer for a value description to be entered at SVD in step 3008 and a pattern is set in step 3009 as (BEFORE SV SVD). If the viewer indicates that the status type is to be a "change" status type, then the pattern is set in step 3010 as (CHANGE SV). If, however, the viewer selects the status type as "after," then in step 3011 the computer asks the viewer for value description SVD and the pattern is set in step 3012 as (AFTER SV SVD). These are four primitive action or status pattern types. If the viewer indicates that a composite pattern type is required, then the computer then inquires at step 3013 whether the composite type is an AND, NOT, or OR type signal. If the viewer indicates that it is an AND type, then the computer asks the viewer for a list of subpatterns to be supplied to SPL in step 3014 and the pattern is set as (AND SPL) in step 3015. If the viewer indicates that the composite type is NOT type, then the computer asks the user to identify the subpattern and this is entered as SP in step 3016 and the pattern is set as (NOT SP) in step 3017. Finally, if the composite type is OR, then the computer asks the viewer for a list of subpatterns entered as SPL in step 3018 and the pattern is set as (OR SPL) as step 3019. The subpatterns may be defined by composite patterns or by primitive patterns such as action or status type patterns, so that when a composite type pattern is provided, the computer algorithm will call itself recursively in steps 3015, 3017 and 3019.

Figure 31:
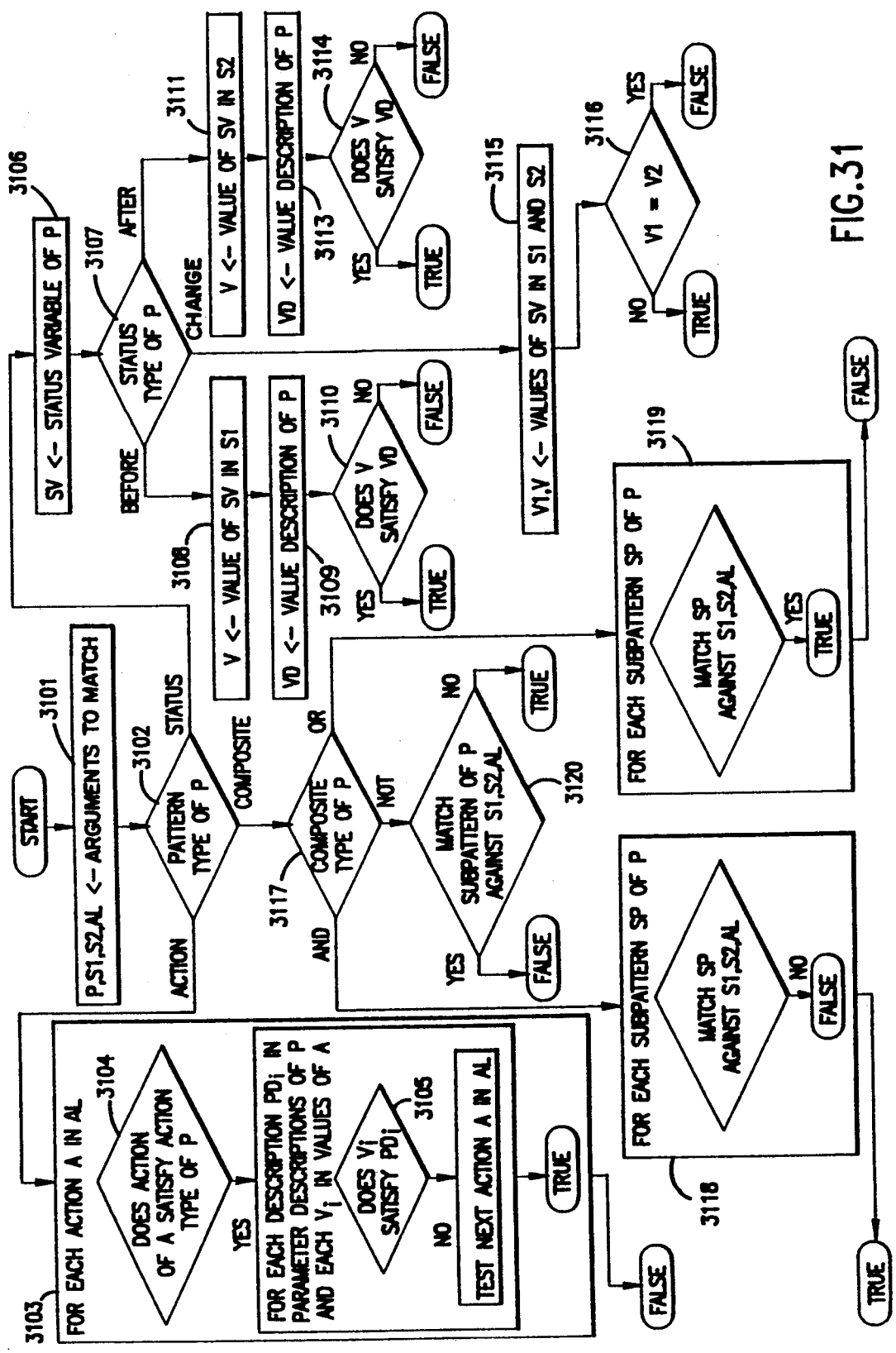
FIG. 31 illustrates an algorithm for matching a subevent with a subevent pattern in accordance with the second embodiment of the present invention.

The services rendered to the viewer using the encoded description in the second embodiment of the invention generally rely on the ability to test whether or not a specific subevent matches a pattern specified as being of interest to the viewer. FIG. 31 illustrates an algorithm which might be used to perform a pattern matching operation in this embodiment of the invention.

Tests within the matching algorithm of FIG. 31 are used to determine whether or not an action in a subevent satisfies an action in a pattern and whether or not a parameter value satisfies a parameter description. The exact nature of these tests depends on the specific details of the event being broadcast. In the case of the baseball examples provided, the actions in the patterns are always the same types of actions that can occur in the encoded description, so the action is simply a test of whether the action in the pattern and the action in the subevent are the same. The parameter descriptions for the baseball example include special indicators, such as "AnyPlayer" or "AnyField" which are satisfied by any player or any field. Thus, the pattern "(ACTION HomeRun AnyField)" is satisfied by "[HomeRun RightField]" or by "[HomeRun CenterField]" or by "[HomeRun LeftField]".

In the algorithm of FIG. 31, the arguments to be matched are set as P, S1, S2, and AL, for the pattern, the status before the subevent, the status after the subevent, and the subevent action list respectively, at step 3101. At step 3102, the pattern type is identified as either an action, composite, or status pattern. If an action pattern type is indicated, then subalgorithm 3103 is performed for each action A in AL. This subalgorithm includes step 3104 where the action is tested to determine if it satisfies the action type of P. If it does, then for each description $PD_i$ in the parameter descriptions of P and each $V_i$ in values of A, step 3105 determines whether $V_i$ satisfies $PD_i$. If any $V_i$ does not satisfy the corresponding $PD_i$, then subalgorithm 3103 is performed for the next action of AL; if all $V_i$ satisfy the corresponding $PD_i$, then there is a pattern match. If subalgorithm 3103 does not succeed for any A in AL, then there is no match.

If the pattern type is a status type, then SV is designated with the status variable of P in step 3106. Then in step 3117, the status type of P is determined as being either "before," "change," or "after". If "before", then the value of SV in S1 is set in V in step 3108 and the value description of P is set in VD in step 3109 and in step 3110, V is compared to VD. If they match, then it is a true match, if they do not, there is no match. If the status type at step 3107 is indicated to be "after", then a similar activity is carried out, only this time with the value of SV in S2 in step 3111 being designated as V with the value description of P being set again in VD in step 3113. Step 3114 compares V and VD to determine whether there is any match existing. If the status type identified in step 3107 is a "change" type, then the values of SV in S1 and S2 are set in V1 and V2 in step 3115 and Vi is tested against V2 in step 3116. If they are equal, then there was no change, and therefore no match. If they are not equal, there was a status change, and therefore a true match. Finally, if the pattern type of P is identified as composite, in step 3117, the composite type of P is determined as being AND, NOT, or OR. If AND, then subalgorithm 3118 is performed such that for each subpattern SP of P, the algorithm determines whether there is a match of SP with S1, S2, AL. If any subpattern fails to match, then there is no match. However, if OR is identified, then subalgorithm 3119 is performed and to the extent that there is a match of any subpattern SP against S1, S2 and AL, then the match produces a true output. If the composite type of P is NOT, then in step 3120 there is a test to match the subpattern of P against S1, S2 and AL and if they do not match, then a true output is produced and if they do match, then a false output is produced.

FIGS. 32A to 32D illustrate the behavior of the algorithm for each of the subevents described in textual fashion in FIG. 22. The subevents of interest are those defined by the patterns set forth in FIG. 29, strings 1, 2 and 3 namely, the change of any home score or away score; the action a home run to any field; and the condition of a particular batter with runners at certain bases. These are respectively identified as patterns 1, 2 and 3. The outcome of the matching operation for the various subevents compared to those patterns is illustrated in FIGS. 32A to 32D. For example, in FIG. 32A(1), a matching operation is performed between the characterization of subevent no. 4 where Foster is at bat before the subevent, and where Pedrique is at bat with Foster at third base and the score is zero for the home team and zero for the away team after the subevent. Pattern 1 checks for a change of score of either the home or away team. In performing the algorithm, the home score and the away score remain the same based on the action of the subevent, the triple by Foster, so that there is no match, i.e., the result is FALSE. The matching operation of pattern two to subevent 4 is illustrated at (2) where pattern seeks to detect whether a home run has been hit to any field. The action in question was a triple to right field, and thus the result is FALSE. Finally, pattern 3 seeks the condition where Pedrique is the batter with a runner on second or a runner on third. Since the earlier batter was Foster and not Pedrique, the outcome is FALSE. In FIG. 32B, the three patterns are compared in three different matching operations to subevent 5. As a result of the action of subevent 5 where Pedrique successfully bunts Foster from third base to home, the score changes for the away team so that the match operation with respect to pattern 1 which looks for a change of score results in a TRUE outcome. However, there is no home run as one of the actions so that a matching operation compared to pattern 2 produces a FALSE result. Finally, as Pedrique came to bat with a runner at third base, Foster, pattern 3 is satisfied and the recursive operation results in a true match as indicated at 32B(3). FIGS. 32C and 32D provide further description of the outcome of the matching operations when performed with respect to patterns one, two and three versus subevent 6 and subevent 7.

FIG. 33 illustrates a table which summarizes the results of performing the matching algorithm with respect to patterns 1, 2 and 3 of FIG. 29 and subevents 4, 5, 6 and 7 of FIG. 22.

The viewer's computer uses the pattern-matching algorithm to notify the viewer about subevents of interest. Generally, the viewer advises the computer as to the subevents of particular interest to the viewer and the computer maintains a list of patterns which characterize those subevents. When the computer receives a broadcast signal, it performs a comparison operation with each subevent against each stored pattern in the list of patterns of subevents of interest. Whenever a successful match is found, the viewer is notified by generating special audio or visual signals. The visual signals may be displayed on either the computer screen or on the screen of the television which receives the video signals combined with the encoded description.

This notification aspect of the present invention is not limited to one way communication or broadcast environments as illustrated in FIG. 20. Instead, such notification can be used in a two-way communication system where the user transmits information, such as a request for a broadcast, to a centralized information source or database. The information transmitted by the user can also constitute information about patterns of interest as described below.

There are two types of notification. If a pattern consists solely of status patterns that apply to the status variables before a subevent, then the pattern is tested before the start of each subevent, but after the previous subevent, and the viewer is notified that a subevent of interest is about to occur. Other patterns are tested after the end of each subevent and the viewer is notified that a subevent of interest has just occurred.

Further, in connection with the notification capability, a user can view a first event and set patterns of interest for one or more of a plurality of other events which are the subject of coded description. In such a case, for example, a user could be viewing the subevents for a first baseball game. At the same time, the user may be interested in the subevents of a second baseball game e.g., a change in score, a particular player coming to bat, a pitching change etc. The user can enter patterns of interest related to the subevents of interest in the second game. Then the pattern matching algorithm, whether it is performed at the viewer's computer or the database, will examine the codes describing the subevents of the second game while the user observes the first game. If a subevent of interest has taken place, the pattern matching system notifies the user of that fact. The user can then "freeze" or stop review of the first event and view the subevent of interest. Once the user has completed viewing of the portion or portions of the second subevent that are of interest, the user can return to viewing the first subevent, resuming the viewing operation at that point in the first subevent where the viewer "froze" the viewing operation.

Figure 34:
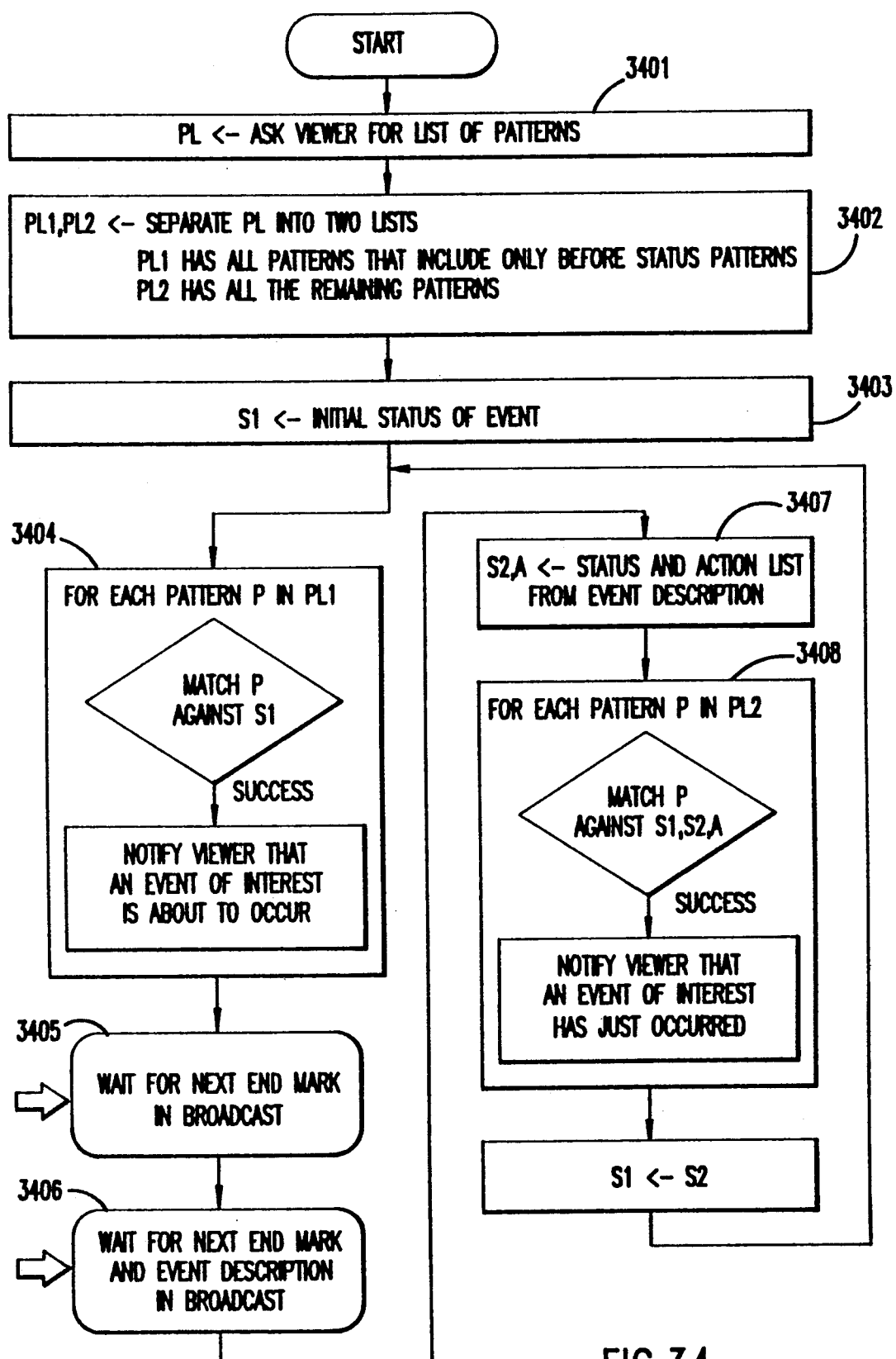
FIG. 34 illustrates an algorithm for detecting subevents of interest in accordance with the second embodiment of the present invention.

FIG. 34 illustrates an algorithm for detecting subevents of interest. In step 3401, the computer asks the viewer for a list of patterns corresponding to subevents of interest. These are entered in PL. At step 3402, the list PL is separated into two sublists PL1 and PL2. PL1 has all of the patterns that include only BEFORE status patterns while PL2 has all of the remaining patterns. Of the patterns set forth in FIG. 29, patterns 1 and 2 would be placed in list PL2 and pattern 3 would be placed in list PL1. The initial status of the event is set as S1 in step 3403. For each pattern P in PL1, a match operation is performed comparing the patterns P against S1 in step 3404. If there is a success, then the viewer is notified that an event of interest is about to occur. The computer then waits for the next start mark in a broadcast. This is step 3405. After receiving the start mark, the computer waits for the end mark and event description in the broadcast at 3406 and sets the status and action from the event description in S2 and A, respectively. Then, for each pattern P of PL2, a match operation of P against S1, S2 and A is performed and the viewer is notified that an event of interest has just occurred if a success is found, S2, the new status of the event, is then set in S1 and the operation is repeated.

In the examples illustrated, as indicated in FIG. 33, subevent 4 does not provide any match for any of the patterns in pattern lists PL1 and PL2. Subevent 5 provides a match for status change in the score, after the event occurs so that it matches with a pattern in PL2 and also notifies the viewer before the event occurs because it matches pattern 3 which belongs to pattern list PL1 of events that happen before the action. Furthermore, subevent 6, like subevent 4, has no matches with patterns 1, 2 and 3. Finally, subevent 7 has matches with patterns 1 and 2 and therefore only notifies the viewer after the event has occurred because both patterns 1 and 2 belong to pattern list PL2.

Under this pattern listing and matching scheme, it is possible for a viewer to view a subevent of interest even after it has occurred. If the event is being broadcast using conventional television broadcast techniques, the viewer's receiver can include a video recorder as well as a computer so that the subevent may be replayed. Alternatively, the viewer's receiver may use simulation techniques to display the subevent, based on information in the subevent description shortly after it has concluded in accordance with the description of simulation techniques set forth in embodiment 1 above.

Figure 35:
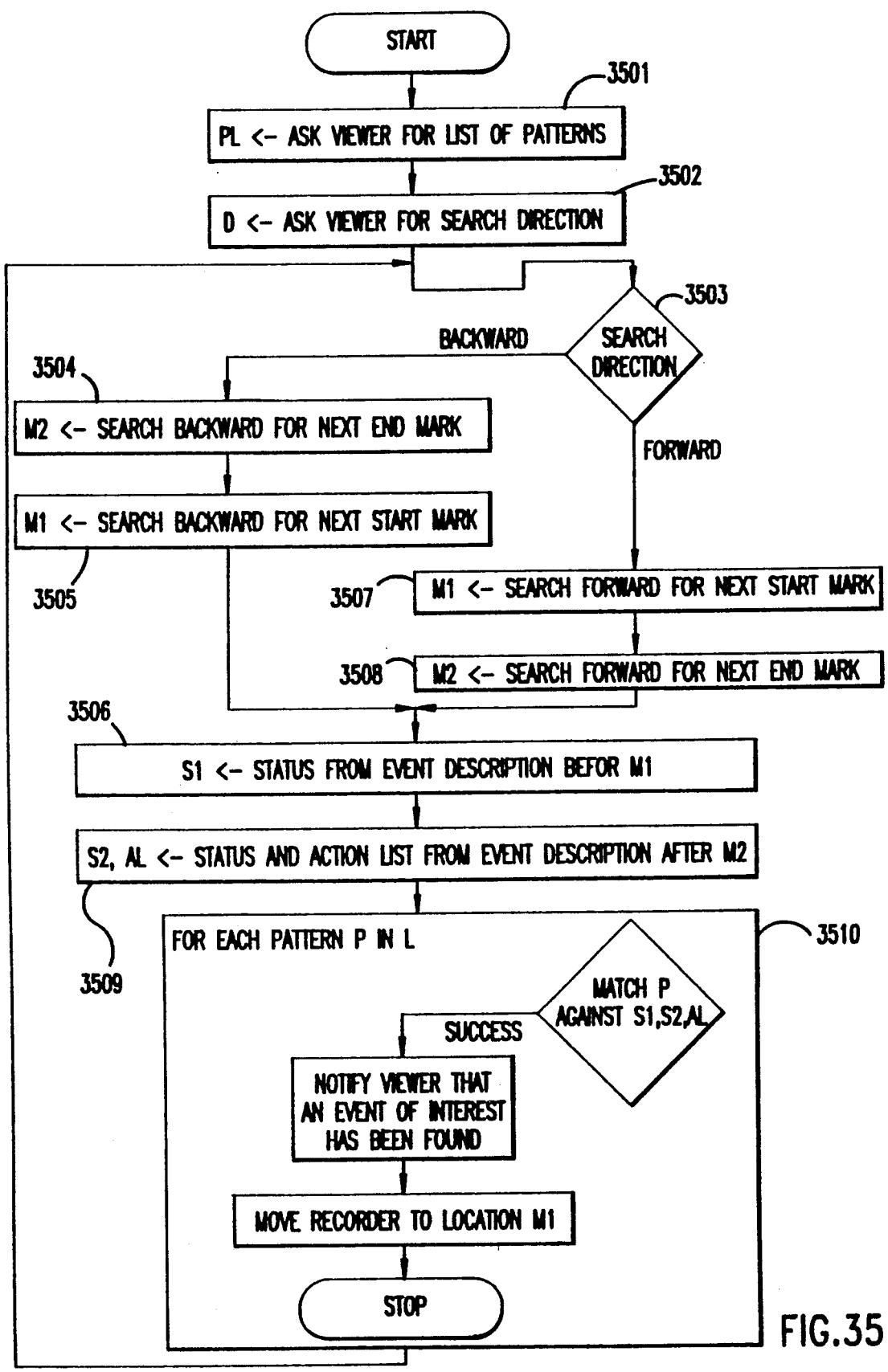
FIG. 35 illustrates an algorithm for searching a recorded broadcast for subevents of interest in accordance with the second embodiment of the present invention.

The viewer's computer can also use the pattern-matching algorithm to search through a recorded broadcast for subevents of interest. There are two basic techniques to accomplish this. One is similar to the notification technique: simply search through the recorded broadcast, either forward or backward, testing each subevent against the patterns in the list that characterizes subevents of particular interest to the user. Whenever a subevent of interest is detected, the recorded broadcast is positioned at the start mark of the event so that the viewer may view the broadcast. The suitable algorithm is shown in FIG. 35.

In step 3501, the computer asks the viewer for a list of patterns. In step 3502, the computer asks the viewer to provide a search direction, if the search direction is detected as being backward in step 3503, then the search continues in a backward direction looking for the next end mark and designates that as M2 in step 3504. The search backward continues to determine the next start mark which is designated as M1 in step 3505. If the search takes place in a forward direction, then the apparatus first searches forward for the next start mark in step 3507 and sets that start mark as M1. This is followed by searching forward further for the next end mark and setting that as M2 in step 3508. After step 3505 or 3508, the status from the event description from before M1 is set as S1 in step 3506. The status and action list from the event description after M2 is set at S2, AL in step 3509. In subalgorithm 3510, a match algorithm is carried out matching each pattern P in PL against S1, S2 and AL. If there is a success, the viewer is notified that an event of interest has been found. Furthermore, the recorder is then moved to location M1 so that the event can be replayed. If not, the search continues in the direction of choice.

In the case of the baseball examples set forth above in FIG. 22, if the search is forward from before subevent 4, subevent 5 matches patterns one and three, so that the recorder is then moved to a start mark that corresponds to time 1:47:30 indicating the start of subevent 5. If the forward search is continued, then the subevent 7 matches patterns one and two so the recorder is then moved to the start mark that corresponds to time 1:51:30. If a backward search is performed starting from after subevent 7, then subevent 7 would be found first, then followed by subevent 5.

Figure 36:
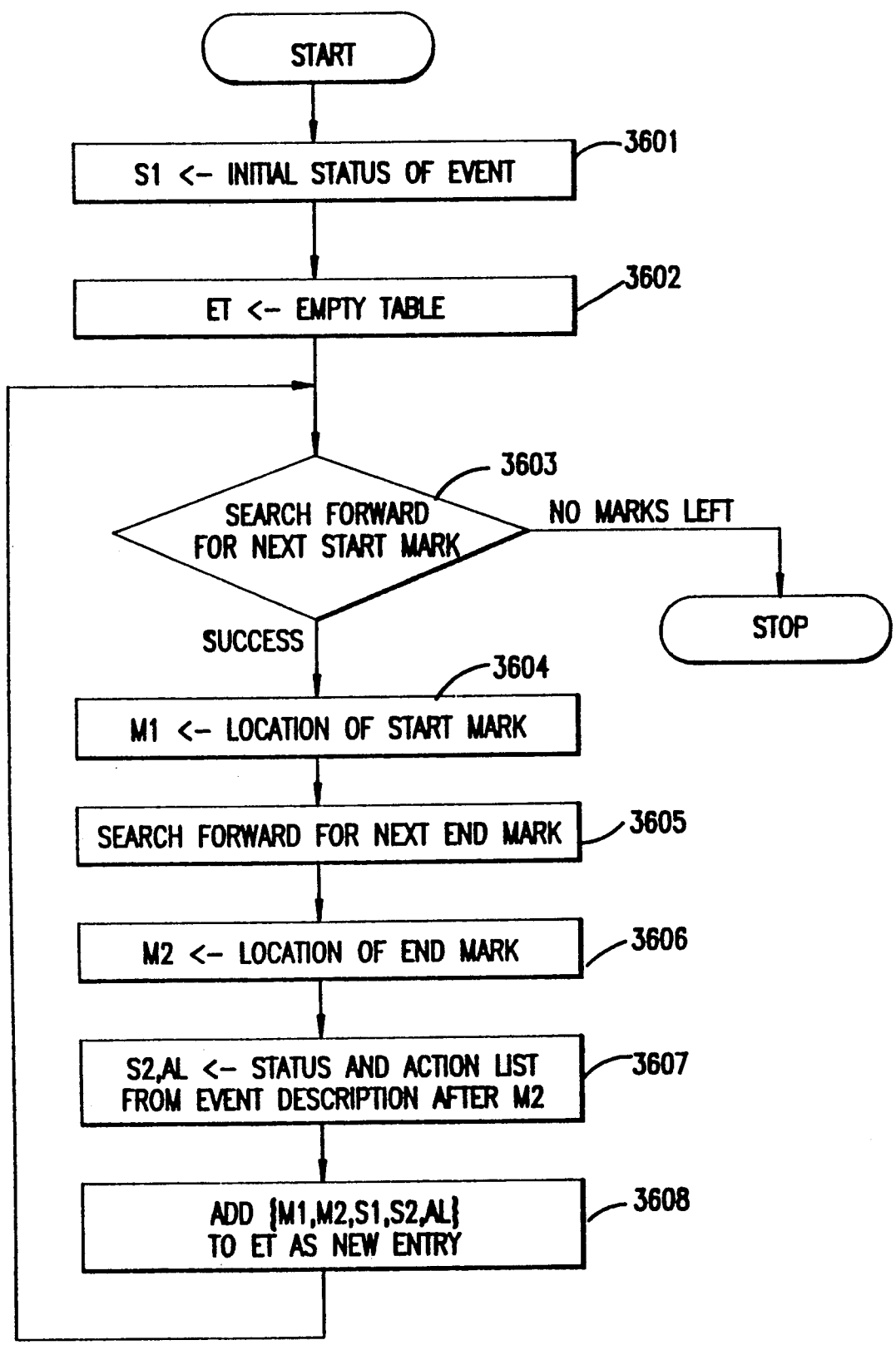
FIG. 36 illustrates an algorithm for constructing an index table of subevents of an event in accordance with the second embodiment of the present invention.

A second technique to search through the recorded broadcast involves constructing a separate tabular data structure to be used as an index to the entire recorded broadcast. With this technique, the computer builds the index table by scanning the entire event, either while it is being broadcast or by replaying the recording after the broadcast is complete. An algorithm for constructing the table is illustrated in FIG. 36. According to that algorithm, the initial status of the event is set at S1 in step 3601 and an empty table is set as ET in 3602. A search is set in a forward direction looking for the next start mark in step 3603. If no marks remain, then the operation stops. If, however, there is success, then in step 3604 the location of the start mark is set as M1. Subsequently, in step 3605, the computer searches forward for the next end mark which, when found, is designated as M2 at step 3606. The status and action list from the event description that follows M2 in the encoded description are set at S2 and AL in step 3607. The information M1, M2, S1, S2, AL are also added to ET as a new entry in step 3608 and the search is continued in a forward direction.

Figure 37:
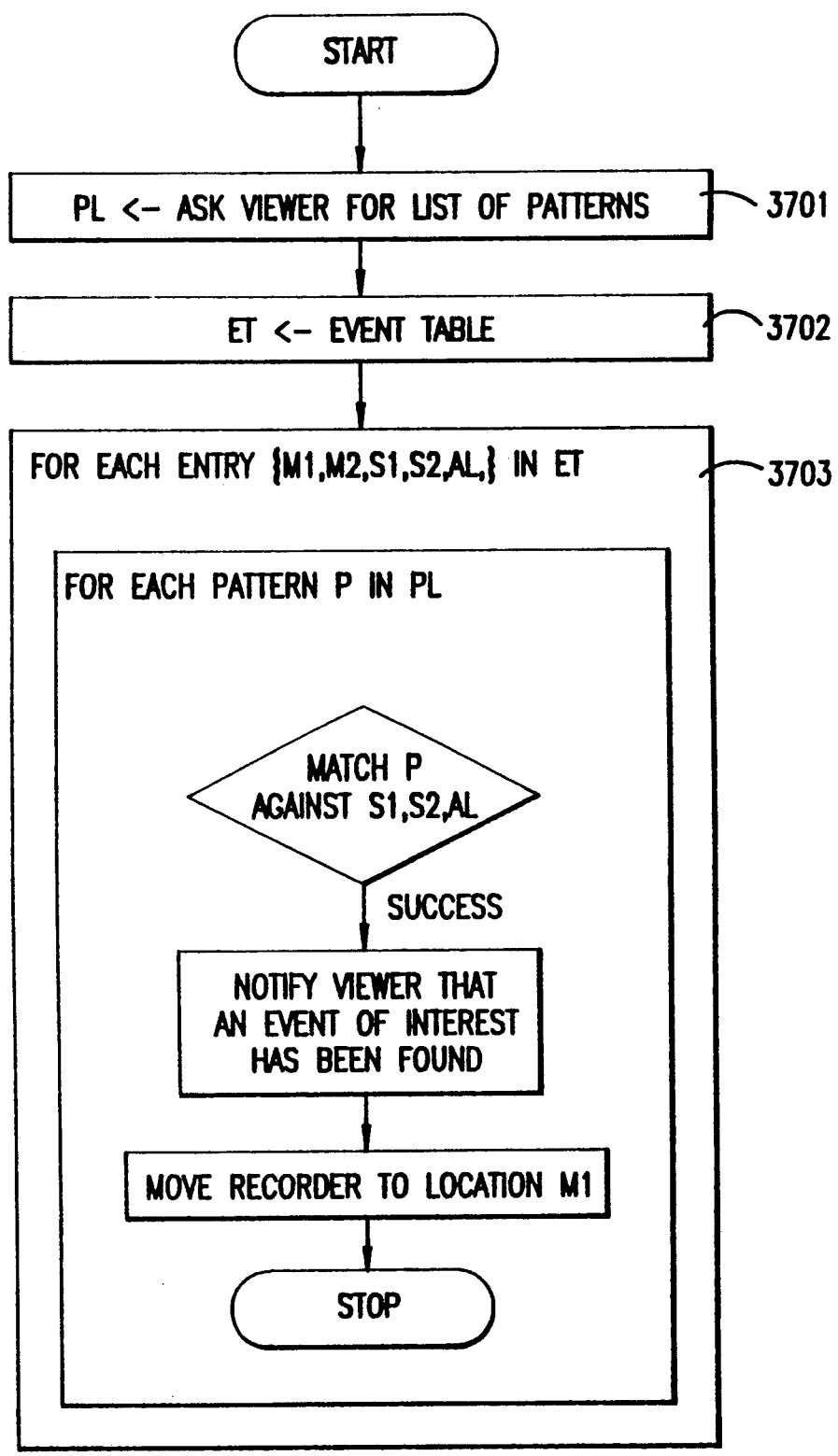
FIG. 37 illustrates an algorithm for using an index to locate subevents stored in the table in accordance with the algorithm of FIG. 36 in accordance with the second embodiment of the present invention.

Once the table has been constructed using an algorithm such as that in FIG. 36, it can be easily searched for subevents that match the viewer's patterns. When such a subevent is detected, the recorded broadcast can be positioned at the start mark of the subevent for viewing by the viewer. FIG. 37 illustrates an algorithm which can perform this function. In particular, at step 3701, the computer asks the viewer to provide a list of patterns identifying subevents of interest. An event table is accessed as step 3702. Then, in step 3703 for each entry in the event table, the pattern P in the list of patterns PL, is subjected to a match operation against S1, S2, and AL of each entry. If a successful match is performed, then the viewer is notified that an event of interest has been found and the recorder is moved to the location designated by M1 corresponding to the matching S1, S2 and AL.

In connection with the second embodiment of the present invention, the viewer's computer may use simulation techniques to display the subevent based on the information in the event table as described in embodiment one above. Furthermore, when the event is being broadcast symbolically, the description of the entire event effectively serves as its own index.

Furthermore, in the second embodiment of pattern matching, it is not necessary that the matching operation be performed at the viewer's computer. In fact, it is possible that the user, by way of two way communication, can transmit information regarding patterns of interest to a centralized database and the stored code information in that database can be searched for a subevent or subevents that match any pattern of interest. Upon detection of a match, the appropriate descriptive information regarding the subevent or subevents of interest is transmitted to the user's computer. Therefore, by using two way communication, the user can select the information to be transmitted.

The present invention has been described in terms of basic algorithms and computer elements which can be utilized to carry out a broadcast of live events utilizing computer simulation techniques, where the techniques are familiar to those in the art.

Finally, it is of course possible to use any of the transmission and reception techniques of the first embodiment of the invention in a realization of the second embodiment of the invention. Therefore, it is possible to transmit the combined signal of the second embodiment to a centralized database as in FIG. 1. The modes of transmission to the viewer's computer can be by telephone or RF techniques as in FIGS. 6 and 8. Cable and other wireless transmission techniques beyond RF transmission are also possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for broadcasting information about a live event that is constituted by a plurality of subevents, each subevent including at least one action, comprising the steps of:

producing a first information signal comprising an audio description of the event;

producing a second information signal, said second information signal including a sequence of symbolic representations for each subevent of the event, each sequence including a value for at least one status variable that defines the status of the event at a particular time in relation to the subevent represented by that sequence, said second information signal comprising a signal from which a computer simulation of the event described by the first information signal can be produced;

producing a broadcast signal by combining said first and second second information signals;

transmitting said broadcast signal from a first location;

receiving said broadcast signal at a second location;

separating said broadcast signal into said first and second information signals;

analyzing said second information signal using pattern-matching techniques to detect subevents and status information of interest;

selectively producing an audio representation of the event using said first information based on the detection of subevents and status information of interest by said step of analyzing.

2. A method for broadcasting information about a live event that is constituted by a plurality of subevents, each subevent including at least one action, comprising the steps of:

producing a first information signal comprising a video description of the event;

producing a second information signal, said second information signal including a sequence of symbolic representations for each subevent of the event, each sequence including a value for at least one status variable that defines the status of the event at a particular time in relation to the subevent represented by that sequence, said second information signal comprising a signal from which a computer simulation of the event described by the first information signal can be produced;

producing a broadcast signal by combining said first and said second information signals;

transmitting said broadcast signal from a first location;

receiving said broadcast signal at a second location;

separating said broadcast signal into said first and second information signals;

analyzing said second information signal using patternmatching techniques to detect subevents and status information of interest;

selectively producing a video representation of the event using said first information signal based on the detection of subevents and status information of interest by said stp of analyzing.

3. The method of claim 1 or claim 2 further comprising the steps of:

storing the received broadcast signal;

searching the stored signals to detect a match between a stored symbolic representation and a symbolic representation of subevents and status information of interest;

upon detecting the match, accessing the corresponding subevent from said received signal represented by the portions of said first and said second information signals corresponding to that subevent.

4. The method of claim 1 or claim 2 wherein each said sequence of symbolic representations includes a subevent identifier, an action code corresponding to each action in the associated subevent, and a status code representing the status of the event associated with the subevent.

5. The method of claim 1 or claim 2 wherein said second location is a computer remote from the location of the event.

6. The method of claim 5 further comprising the steps of:

storing the received broadcast signal;
searching the stored signal to detect a match between a stored symbolic representation and a symbolic representation of subevents and status information of interest;
upon detecting the match, accessing the corresponding subevent from said received signal represented by the portions of said first and said second information signals corresponding to that subevent.

7. The method of claim 1 or claim 2 wherein said step of producing said second information signal comprises the step of entering a sequence of codes defining the event, including codes defining the subevents of the event and the status of the event related to each subevent.

8. The method of claim 7 wherein said second location is a computer remote from the location of the event.

9. The method of claim 8 further comprising the steps of:
storing the received broadcast signal;
searching the stored signal to detect a match between a stored symbolic representation and a symbolic representation of subevents and status information of interest;
upon detecting the match, accessing the corresponding subevent from said received signal represented by the portions of said first and said second information signals corresponding to that subevent.

10. In a system for broadcasting information about an event, including descriptions of subevents and a status of the event associated with each subevent, a method for detecting subevents of interest comprising the steps of:
entering codes in a first computer, said codes defining information of interest;
generating a pattern from said codes;
entering subevent descriptors in a second computer, said subevent descriptors describing the subevents and status of the event;
transmitting said subevent descriptors to said first computer;
comparing said codes of said pattern to said subevent descriptors at said first computer; and
when said step of comparing detects a subevent descriptor that matches one of said codes, producing a signal indicating such a match.

11. The method of claim 10 wherein said subevent descriptors associated with a subevent include at least one status variable value and at least one action-type descriptor.

12. The method of claim 10 wherein said subevent pattern is a primitive pattern identifying one item of information of interest to the user of the first computer.

13. The method of claim 12 wherein said subevent descriptors associated with a subevent include at least one status variable value and at least one action-type descriptor.

14. The method of claim 10 wherein said subevent pattern is a composite pattern defining at least two items of information of interest to the user of the first computer.

15. The method of claim 14 wherein said subevent descriptors associated with a subevent include at least one status variable value and at least one action-type descriptor.

16. The method of claim 10, further comprising the steps of:
combining the subevent descriptors with a second information signal that provides a representation of the event;
transmitting said combined signal to said first computer;
separating said subevent descriptors from said second information signal at the first computer;
storing said second information signal for later reproduction; and
reproducing a portion of said second information signal when said step of comparing detects a match of a subevent descriptor and said pattern, the reproduced portion being representative of the subevent corresponding to the subevent descriptor that matched said pattern.

17. A system for broadcasting information about events comprising a plurality of subevents using computer pattern-matching techniques, comprising:
for entering a code sequence to define each subevent into a first computer;
means for storing a subevent pattern defining a subevent of interest in a second computer;
means for transmitting said code sequence from said first computer to said second computer;
means for receiving said transmitted code sequence at said second computer; and
means for analyzing said received code sequence to detect the occurrence of a desired subevent in the event, said means for analyzing including,
means for comparing said code sequence to said subevent pattern to determine if the code sequence matches the subevent pattern, and
means for producing a notification signal when said means for comparing detects a match.

18. A system for broadcasting information about events comprising a plurality of subevents using computer patternmatching techniques, comprising:
means for producing an information signal that provides a video description of an event;
means for entering a code sequence to define each subevent of said event into a first computer, said code sequence constituting information from which a computer simulation of the event described by said information signal can be produced;
means for storing a subevent pattern defining a subevent of interest in a second computer;
means for combining said code sequence and said information signal;
means for transmitting the combination of said code sequence and said information signal to said second computer;
means for receiving the combined signal at said second computer;
means for separating said received combined signal into said code sequence and said information signal; and
means for analyzing the code sequence of the received combined signal to detect the occurrence of a desired subevent in the event, said means for analyzing including,
means for comparing said code sequence to said subevent pattern to determine if the code sequence matches the subevent pattern; and
means for reproducing a portion of said second information signal when said means for comparing detects a match between said code sequence and said subevent pattern, the reproduced portion being representative of the subevent corresponding to the code that matches the subevent pattern.

19. A system for broadcasting information about events comprising a plurality of subevents using computer pattern-matching techniques, comprising:

means for producing an information signal that provides an audio description of an event;

means for entering a code sequence to define each subevent of said event into a first computer, said code sequence constituting information from which a computer simulation of the event described by said information signal can be produced;

means for storing a subevent pattern defining a subevent of interest in a second computer;

means for combining said code sequence and said information signal;

means for transmitting the combination of said code sequence and said information signal to said second computer;

means for receiving the combined signal at said second computer;

means for separating said received combined signal into said code sequence and said information signal; and means for analyzing the code sequence of the received combined signal to detect the occurrence of a desired subevent in the event, said means for analyzing including, means for comparing said code sequence to said subevent pattern to determine if the code sequence matches the subevent pattern; and means for reproducing a portion of said second information signal when said means for comparing detects a match between said code sequence and said subevent pattern, the reproduced portion being representative of the subevent corresponding to the code that matches the subevent pattern.

* * * * *

UNITED STATES PATENT AND TRADEMARK OFFICE
CERTIFICATE OF CORRECTION

PATENT NO. : 5,189,630

DATED : February 23, 1993

INVENTOR(S) : David R. Barstow, et al

It is certified that error appears in the above-indentified patent and that said Letters Patent is hereby corrected as shown below:

| Column | Line | |
|---|---|---|
| 3 | 16 | After "a" (second occurrence) delete "v". |
| 13 | 22 | Change "give" to --given--. |
| 17 | 34 | After "of" insert --a--. |
| 19 | 16 | Change "string i," to --string 1.--. |
| 19 | 19 | Change "2, and 3," to --2. and 3.--. |
| 19 | 22 | Change "2, and 3," to --2. and 3.,--. |
| 19 | 37 | Change "string 1," to --string 1.--. |
| 19 | 38 | Change "string 2," to --string 2.--. |
| 19 | 39 | Change "string 3," to --string 3.--. |
| 22 | 3 | After "pattern" insert --2--. |
| 19 | 23 | Change "4," to --4.-- |
| 26 | 14 | After "information" insert --signal--. |
| 26 | 41 | Change "ternmatching" to --tern-matching--. |

UNITED STATES PATENT AND TRADEMARK OFFICE
CERTIFICATE OF CORRECTION

PATENT NO. : 5,189,630

DATED : February 23, 1993

INVENTOR(S) : David R. Barstow, et al

It is certified that error appears in the above-indentified patent and that said Letters Patent is hereby corrected as shown below:

Column 28, line 19, before "for" insert --means--

Signed and Sealed this

Eighth Day of February, 1994

Attest:

BRUCE LEHMAN

*Attesting Officer*     *Commissioner of Patents and Trademarks*